United States Patent
Xiong et al.

(10) Patent No.: US 11,200,847 B2
(45) Date of Patent: Dec. 14, 2021

(54) DISPLAY PANEL, DISPLAY DEVICE AND DRIVE METHOD

(71) Applicant: Shanghai Tianma AM-OLED Co., Ltd., Shanghai (CN)

(72) Inventors: Nana Xiong, Shanghai (CN); Tianyi Wu, Shanghai (CN)

(73) Assignee: Shanghai Tianma AM-OLED Co., Ltd., Shanghai (CN)

(*) Notice: Subject to any disclaimer, the term of this patent is extended or adjusted under 35 U.S.C. 154(b) by 166 days.

(21) Appl. No.: 16/567,933

(22) Filed: Sep. 11, 2019

(65) Prior Publication Data

US 2020/0312247 A1    Oct. 1, 2020

(30) Foreign Application Priority Data

Mar. 29, 2019  (CN) .......................... 201910251687.9

(51) Int. Cl.
```
G09G 3/3266      (2016.01)
G09G 3/36        (2006.01)
G02F 1/167       (2019.01)
```
(52) U.S. Cl.
CPC .......... *G09G 3/3266* (2013.01); *G02F 1/167* (2013.01); *G09G 3/3677* (2013.01); *G09G 2310/0251* (2013.01); *G09G 2310/0286* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 2008/0246703 | A1* | 10/2008 | Smith ................. | G09G 3/3216 345/80 |
| 2013/0201090 | A1* | 8/2013 | Ohara ................. | G09G 3/3677 345/87 |
| 2017/0004760 | A1* | 1/2017 | Jang ...................... | G11C 19/28 |
| 2017/0200412 | A1* | 7/2017 | Gu .......................... | G09G 5/005 |
| 2017/0308194 | A1* | 10/2017 | Guard .................... | G09G 5/02 |

* cited by examiner

*Primary Examiner* — Parul H Gupta
(74) *Attorney, Agent, or Firm* — Alston & Bird LLP

(57) ABSTRACT

A display panel includes multiple scanning lines, sub-pixels and a scanning drive circuit. The sub-pixels include first sub-pixels, second sub-pixels and third sub-pixels. Each scanning line connects to sub-pixels of one same type of emission. The first sub-pixels include a first group and a second group, and the third sub-pixels include a first group and a second group. The scanning drive circuit is used for driving a fraction of the sub-pixels in one frame. In odd frames, only first group of the first sub-pixels, and the third sub-pixels, and the second sub-pixels are driven to emit light in odd frames. In even frames, only second group of the first sub-pixels and the third sub-pixels, and the second sub-pixels are driven to emit light. When the display screen is refreshed, the number of the sub-pixels driven to emit light is reduced, and power of charging and discharging of the sub-pixels is reduced.

22 Claims, 10 Drawing Sheets

DISPLAY PANEL, DISPLAY DEVICE AND DRIVE METHOD

CROSS-REFERENCES TO RELATED APPLICATIONS

This application claims priority to a Chinese patent application No. CN201910251687.9 filed at CNIPA on Mar. 29, 2019, disclosure of which is incorporated herein by reference in its entirety.

TECHNICAL FIELD

This application relates to the field of display technologies and, in particular, to a display panel, a display device and a method for driving the display panel.

BACKGROUND

Flat panel display devices have advantages of thin body, power saving, and no radiation, therefore they have been widely applied.

In related arts, to improve display quality of flat panel display devices, a refresh rate of the display panel needs to be adjusted to a special value often at 60 Hz. Each time a display panel is refreshed, it needs to charge or discharge the sub-pixels in the display panel. The higher the refresh rate of the display panel is, more frequently the sub-pixels must be charged and discharged within one second, leading to the larger power consumption of the display panel. However, in the related arts, the scheme for effectively solving the power consumption problem of the display panel has not been addressed properly.

SUMMARY

Embodiments of the present disclosure provide a display panel, a display device and a method for driving the display panel to reduce the power consumption of the display panel.

In a first aspect, the embodiments of the present disclosure provide a display panel. The display panel includes: multiple scanning lines; multiple sub-pixels arranged multiple rows each electrically connected to one of the multiple scanning lines; and a scanning drive circuit.

The sub-pixels in the same row are of a same type of emission. The multiple sub-pixels comprise: first sub-pixels, second sub-pixels and third sub-pixels. The first sub-pixels include a first group of first sub-pixels and a second group of first sub-pixels, and the third sub-pixels include a first group of third sub-pixels and a second group of third sub-pixels.

The scanning drive circuit is electrically connected to the multiple scanning lines individually. The scanning drive circuit is configured to drive the first group of the first sub-pixels, the second sub-pixels and the first group of the third sub-pixels together to emit light at a (2j+1)th frame. The scanning drive circuit is configured to drive the second group of the first sub-pixels, the second sub-pixels and the second group of the third sub-pixels to emit light at a (2j+2)th frame, where j is a non-negative integer.

In a second aspect, the embodiments of the present disclosure provide a method for driving a display panel. The display panel includes: multiple scanning lines, multiple sub-pixels and a scanning drive circuit which are electrically connected to the multiple scanning lines. The multiple sub-pixels include: first sub-pixels, second sub-pixels and third sub-pixels. Each of the multiple scanning lines is connected to sub-pixels of the same type. The first sub-pixels include a first group of first sub-pixels and a second group of first sub-pixels, and the third sub-pixels include a first group of third sub-pixels and a second group of third sub-pixels. The scanning drive circuit is electrically connected to the scanning lines separately. The drive method includes: driving the scanning drive circuit to transmit a scanning signal to the scanning line connected to the first group of first sub-pixels, scanning lines connected to the second sub-pixels and the scanning line connected to the first group of third sub-pixels in a (2j+1)th frame, so as to drive the first group of first sub-pixels, the second sub-pixels and the first group of third sub-pixels to emit light; and driving the scanning drive circuit to transmit a scanning signal to the scanning line connected to the second group of first sub-pixels, scanning lines connected to the second sub-pixels and the scanning line connected to the second group of third sub-pixels in a (2j+2)th frame, so as to drive the second group of first sub-pixels, the second sub-pixels and the second group of third sub-pixels to emit light. j is a non-negative integer.

In a third aspect, embodiments of the present disclosure further provide a display device. The display device includes the display panel described in the embodiments of the present disclosure.

The embodiments of the present disclosure provide a display panel suitable for RGB hybrid frame rate driving. Sub-pixels connected to one scanning line belong to the same type. The scanning drive circuit drives the second sub-pixels to emit light at every frame, drives the first group of the first sub-pixels and the first group of the third sub-pixels to emit light at odd frames, and drives the second group of the first sub-pixels and the second group of the third sub-pixels to emit light at even frames. Compared with the related art, the embodiments of the present disclosure reduce the number of the sub-pixels which emit light when the display screen is refreshed, thereby reducing the power required for charging and discharging the sub-pixels and reducing the power consumption of the display panel. Moreover, in the embodiments of the present disclosure, the number of the second sub-pixels driven to emit light in each frame is not changed compared with the related art. Therefore, an overall refresh rate of the display screen is not changed, the influence to the display quality is small. The embodiments of the present disclosure can be better applied to display panels with higher drive frequency such as the virtual reality display panel.

DETAILED DESCRIPTION

Figure 1:
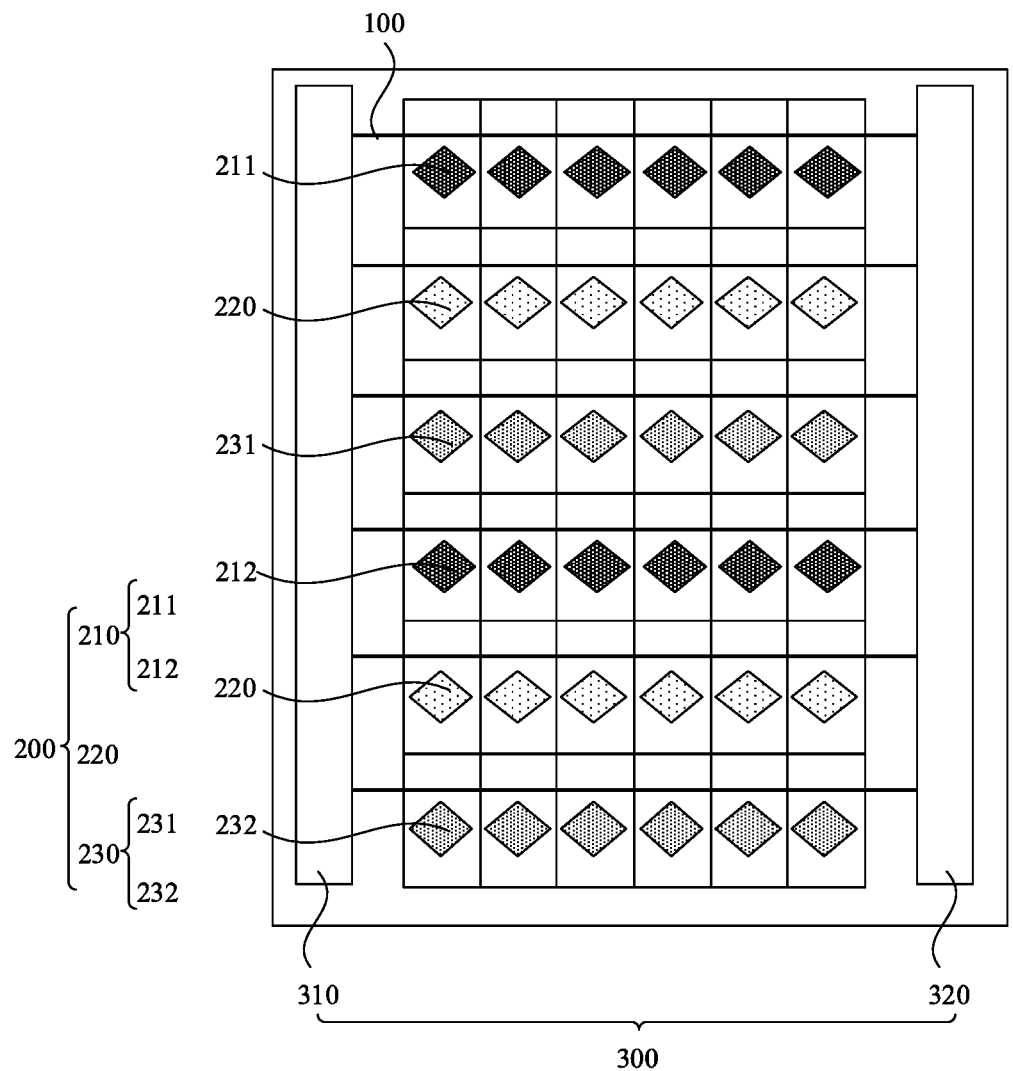
FIG. 1 is top view of a schematic structure diagram of a display panel according to an embodiment of the present disclosure.

Hereinafter the present disclosure will be further described in detail in conjunction with the drawings and embodiments. It is to be understood that the specific embodiments set forth below are intended to illustrate and not to limit the present disclosure. Additionally, it is to be noted that, for convenience of description, only part, not all, of the structures related to the present disclosure are illustrated in the drawings.

FIG. 1 is a structural diagram of a display panel according to an embodiment of the present disclosure. Referring to FIG. 1, the display panel includes multiple scanning lines 100 (FIG. 1 exemplarily shows 6 scanning lines 100), multiple sub-pixels 200 electrically connected to the multiple scanning lines 100, and a scanning drive circuit 300. The multiple sub-pixels 200 are arranged in multiple rows. Each of the multiple scanning lines 100 is connected to the sub-pixels 200 in a respective one of the multiple rows. The multiple sub-pixels 200 include: first sub-pixels 210, second sub-pixels 220 and third sub-pixels 230. Sub-pixels have different types which are illustrated with different symbols or filled with different patterns. The sub-pixels include sub-pixels configured to emit red light, sub-pixels configured to emit blue light, and sub-pixels configured to emit green light. Sub-pixels 200 in the same row are of the same type, that is, sub-pixels 200 in the same row are connected to the same scanning line 100 and have the same type. The first sub-pixels 210 include a first group of first sub-pixels and a second group of first sub-pixels. The third sub-pixels 230 include a first group of third sub-pixels and a second group of third sub-pixels. The scanning drive circuit 300 is electrically connected to the multiple scanning lines 100 individually, and is used for driving the first group of the first sub-pixels 211, the second sub-pixels 220 and the first group of the third sub-pixels 231 to emit light in a (2j+1)th frame as one set, and driving the second group of the first sub-pixels 212, the second sub-pixels 220 and the second group of the third sub-pixels 232 to emit light in a (2j+2)th frame; where j is a non-negative integer.

It should be noted that FIG. 1 shows a repeatable part of the display panel, and the display panel may include $6n$ rows of such sub-pixels 200 and $6n$ scanning lines 100 by repeating the configuration in FIG. 1, where n is an integer greater than 1. As shown in FIG. 1, the 6 rows of sub-pixels 200 include: a first row composed of first sub-pixels 211, a second row composed of second sub-pixels 220, a third row composed of third sub-pixels 231, a fourth row composed of first sub-pixels 212, a fifth row composed of second sub-pixels 220, and a sixth row composed of third sub-pixels 232. The first sub-pixels 211 in the first row belong to the first group of first sub-pixels. The first sub-pixels 212 in the fourth row belong to the second group of first sub-pixels. The third sub-pixels 231 in the third row belong to the first group of third sub-pixels. The third sub-pixels 232 in the sixth row belong to the second group of third sub-pixels.

The first sub-pixels 210, the second sub-pixels 220 and the third sub-pixels 230 may each display one of three primary colors. Through adjusting the grayscale of the first sub-pixel 210, the grayscale of the second sub-pixel 220 and the grayscale of the third sub-pixel 230, various colors may be generated. The first sub-pixels 210, the second sub-pixels 220 and the third sub-pixels 230, for example, may be red sub-pixels, green sub-pixels and blue sub-pixels respectively.

Each scanning line 100 is connected to a row of sub-pixels 200 of the same type, that is, sub-pixels 200 connected to one scanning line are all the first sub-pixels 210, or the second sub-pixels 220 or the third sub-pixels 230. With the configuration each scanning line 100 is connected to sub-pixels 200 of the same type, i.e., one scanning line 100 only controls a row of the sub-pixels 200 of the same type, a certain type of sub-pixels 200 may be selectively scanned in a drive process of the display panel.

The embodiment of the present disclosure does not group the second sub-pixels 220, and the scanning drive circuit 300 may drive all second sub-pixels 220 to emit light at each frame. The embodiment of the present disclosure exemplarily divides the first sub-pixels 210 into two groups, which are the first group of first sub-pixels 211 and the second group of first sub-pixels 212. The first group of first sub-pixels 211 emit light in the (2j+1) frame (an odd frame), the second group of first sub-pixels 212 emit light in the (2j+2) frame (an even frame). Similarly, the embodiment of the present disclosure exemplarily divides the third sub-pixels 230 into two groups, which are the first group of third sub-pixels 231 and the second group of first sub-pixels 232. The first group of third sub-pixels 231 emit light in the (2j+1) frame, and the second group of third sub-pixels 232 emit light in the (2j+2) frame. Therefore, the embodiment of the present disclosure reduces the line scanning frequency of the display panel. For a display panel whose resolution is N rows and M columns, in each frame, only ⅔ of the N rows of sub-pixels 200 are scanned, i.e., only ⅔ of the N rows of sub-pixels 200 are charged and discharged.

In an exemplary embodiment, the drive method of the display panel is as follows. In the (2j+1)th frame, the scanning drive circuit 300 transmits a scanning signal to the scanning line 100 connected to the first group of first sub-pixels 211, the scanning lines 100 connected to the second sub-pixels 220 and the scanning line 100 connected to the first group of third sub-pixels 231 so as to drive the first group of first sub-pixels 211, the second sub-pixels 220 and the first group of third sub-pixels 231 to emit light. In the (2j+1)th frame, the scanning drive circuit 300 transmits the scanning signal to the scanning line 100 connected to the second group of first sub-pixels 212, the scanning lines 100 connected to the second sub-pixels 220 and the scanning line connected to the second group of third sub-pixels 232 so as to drive the second group of first sub-pixels 212, the second sub-pixels 220 and the second group of third sub-pixels 232 to emit light.

According to the above drive method provided by embodiments of the present disclosure, the refresh rate of the first sub-pixels 210 and the refresh rate of the third sub-pixels 230 are both ½ of the refresh rate of the second sub-pixels 220. In each frame of the screen refreshing, the number of second sub-pixels 220 emitting light is greater than the number of first sub-pixels 210 emitting light, and the number of the second sub-pixels 220 emitting light is greater than the number of the third sub-pixels 230 emitting light. The second sub-pixels 220 may be, for example, red sub-pixels. The red sub-pixel reflects the warm tone of the display screen. The number of the red sub-pixels emitting light is configured to be constant at each frame, while the number of the green sub-pixels emitting light and the number of the blue sub-pixels emitting light are reduced, the color temperature of the display screen is lower, which only causes a small influence on the display quality. The second sub-pixels 220 may be, for example, the blue sub-pixels. The blue sub-pixel reflects the cold tone of the display screen. The number of the blue sub-pixels emitting light is configured to be constant in each frame, while the number of the green sub-pixels emitting light and the number of the red sub-pixels emitting light are reduced, the color temperature of the display screen is higher, which only causes a small influence on the display quality.

The embodiments of the present disclosure provide a display panel applicable to the RGB hybrid frame rate driving method. Each scanning line 100 is connected to sub-pixels 200 of the same type. The scanning drive circuit 300 drives the second sub-pixels 220 to emit light in each frame, drives the first group of first sub-pixels 211 and the first group of third sub-pixels 231 to emit light in the odd frames $-2j+1$ frames, and drives the second group of first sub-pixels 212 and the second group of third sub-pixels 232 to emit light in the even frames $-2j+2$ frames. Compared with the related art, the embodiments of the present disclosure reduce the number of sub-pixels 200 emitting light in the refreshing of the display panel is reduced, thereby reducing the power required by charging and discharging of the sub-pixels 200 and reducing the power consumption of the display panel. Also, in the embodiments of the present disclosure, the number of the second sub-pixels 220 driven to emit light in each frame is not changed compared with the related arts. Therefore, an overall refresh rate of the display screen is not changed, the influence on the display quality is negligent and the display panel can be better applicable to applications with a higher drive frequency such as when virtual reality is applied.

It is to be noted that FIG. 1 exemplarily shows that the first group of the first sub-pixels 211 and the second group of the first sub-pixels 212, the second sub-pixels 220, the first group of the third sub-pixels 231, and the second group of the third sub-pixels 232 are connected to different scanning lines 100, which is not intended to limit the present disclosure. In other embodiments, one scanning line 100 may be connected to the first group of the first sub-pixels 211 and the first group of the third sub-pixels 231, one scanning line 100 may be connected to the second group of first sub-pixels 212 and the second group of the third sub-pixels 232, which may be configured as needed in actual application.

Figure 2:
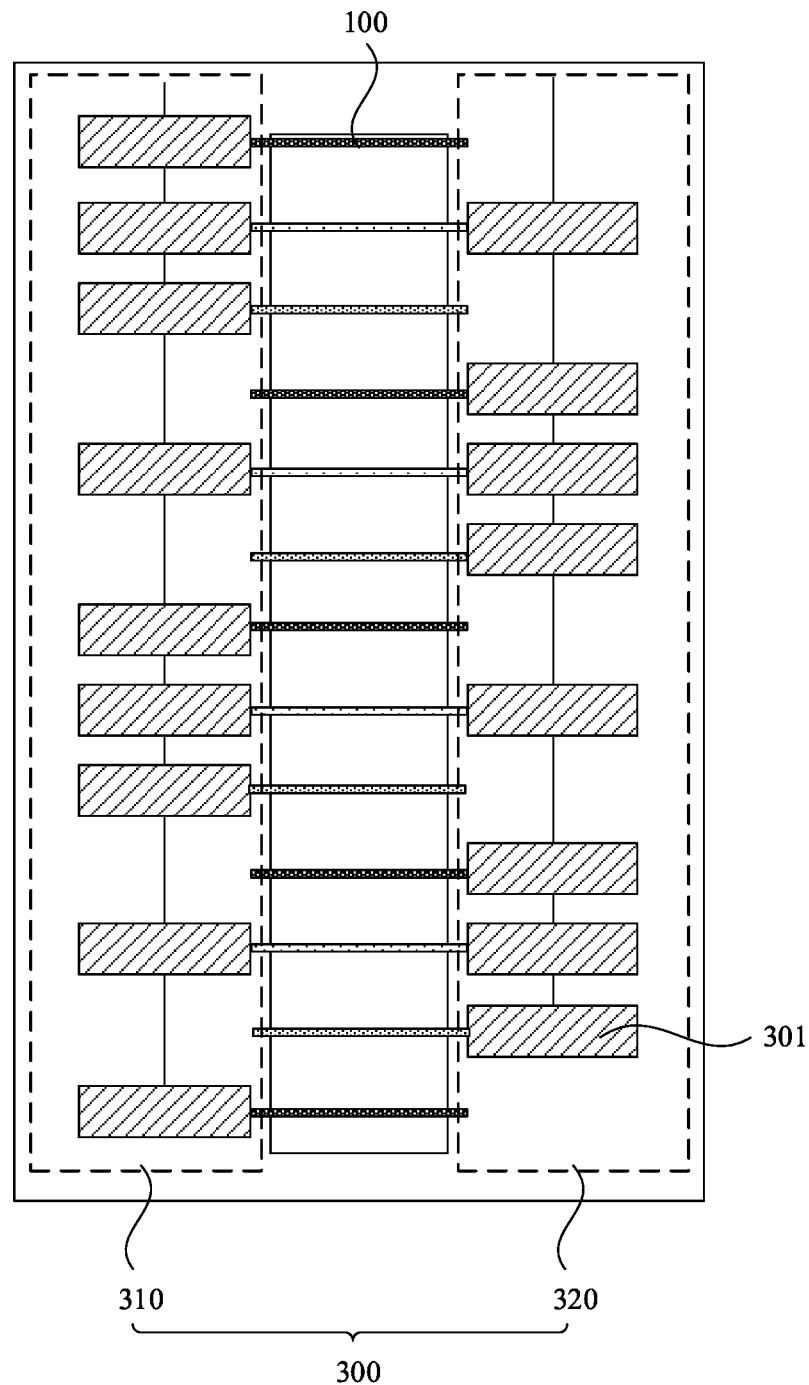
FIG. 2 is top view of a schematic structure diagram of another display panel according to an embodiment of the present disclosure.

FIG. 2 is a top view of schematic diagram of another display panel according to an embodiment of the present disclosure. Referring to FIG. 2, based on the above various embodiment, optionally, the scanning drive circuit 300 includes a first shift registers group 310 and a second shift registers group 320. The first shift registers group 310 is electrically connected to the scanning line 100 connected to the first group of first sub-pixels 211, scanning lines 100 connected to the second sub-pixels 220 and the scanning line 100 connected to the first group of third sub-pixels 231. The second shift registers group 320 is electrically connected to the scanning line 100 connected to the second group of first sub-pixels 212, the scanning lines 100 connected to the second sub-pixels 220 and the scanning line 100 connected to the second group of third sub-pixels 232. With such configuration of the embodiment of the present disclosure, in the (2j+1)th frame, the first shift registers group 310 drives the first group of first sub-pixels 211, the second sub-pixels 220 and the first group of third sub-pixels 231 to emit light, and in the (2j+2)th frame, the second shift registers group 320 drives the second group of first sub-pixels 212, the second sub-pixels 220 and the second group of third sub-pixels 232 to emit light.

Continuously referring to FIG. 2, on the basis of the above various embodiments, optionally, the (6k+1)th scanning line 100 is connected to the first group of first sub-pixels 211, the (6k+2)th scanning line 100 is connected to the first sub-pixels 220, the (5k+3)th scanning line 100 is connected to the first group of third sub-pixels 231, the (6k+4)th scanning line 100 is connected to the second group of first sub-pixels 212, the (6k+5)th scanning line 100 is connected to the second sub-pixels 220, the (6k+6)th scanning line 100 is connected to the second group of third sub-pixels 232; where k is a non-negative integer. The first group of first sub-pixels 211, the second sub-pixels 220, the first group of third sub-pixels 231, the second group of first sub-pixels 212, the second sub-pixels 220 and the second group of third sub-pixels 232 are arranged in six rows respectively, and the six rows, as a unit, are repeatedly arranged to form the sub-pixel array of the display panel, the rows of the sub-pixel array are evenly arranged, which facilitates improving the display quality of the display panel.

Continuously referring to FIG. 2, on the basis of the above various embodiments, optionally, the first shift registers group 310 and the second shift registers group 320 each include multiple cascaded shift registers 301. In the first shift registers group 310, a (4k+1)th stage shift register 301 is electrically connected to the (6k+1)th scanning line 100, a (4k+2)th stage shift register 301 is electrically connected to the (6k+2)th scanning line 100, a (4k+3)th stage shift register 301 is electrically connected to the (5k+3)th scanning line 100, and a (4k+4)th stage shift register 301 is electrically connected to the (6k+5)th scanning line 100. In the second shift registers group 320, a (4k+1)th stage shift register 301 is electrically connected to the (6k+2)th scanning line 100, a (4k+2)th stage shift register 301 is electrically connected to the (6k+4)th scanning line 100, a (4k+3)th stage shift register 301 is electrically connected to the (6k+5)th scanning line 100, and a (4k+4)th stage shift register 301 is electrically connected to the (6k+6)th scanning line 100.

Exemplarily, the display panel provided by the embodiment of the present disclosure may adopt a one-side drive method. Specifically, in the (2j+1)th frame, the first shift registers group 310 is driven to sequentially transmit the scanning signal to a first scanning line 100, a second scanning line 100, a third scanning line 100, a fifth scanning line 100, . . . , a (6k+1)th scanning line 100, a (6k+2)th scanning line 100, a (5k+3)th scanning line 100, a (6k+5)th scanning line 100, . . . ; and the second shift registers group 320 is driven to transmit a disable signal to the scanning lines connected to the second group of the first sub-pixels 212 and the scanning lines connected to the second group of the third sub-pixels 232. Therefore, in the (2j+1)th frame, the first shift registers group 310 sequentially drives the first group of the first sub-pixels 211, the second sub-pixels 220, the first group of the third sub-pixels 231 and the second sub-pixels 220 to emit light. In the (2j+2)th frame, the second shift registers group 320 is driven to sequentially transmit the scanning signal to the second scanning line 100, a fourth scanning line 100, the fifth scanning line 100, a sixth scanning line 100, . . . , the (6k+2)th scanning line 100, a (6k+4)th scanning line 100, the (6k+5)th scanning line 100, and a (6k+6)th scanning line 100, . . . ; and the second shift registers group 320 is driven to transmit the disable signal to the scanning lines connected to the first group of the first sub-pixels 211 and the scanning lines connected to the first group of the third sub-pixels 231. Therefore, in the (2j+2)th frame, the first shift registers group 310 sequentially drives the second sub-pixels 220, the second group of the first sub-pixels 212, the second sub-pixels 220 and the second group of the third sub-pixels 232 to emit light.

Shift registers 301 in the first shift registers group 310 are cyclically arranged with four stages as a repeating unit, and the shift registers 301 in the second shift registers group 320 are cyclically arranged also with four stages as a repeating unit, so as to drive the corresponding sub-pixels 200 to emit light.

On the basis of the above various embodiments, optionally, the first stage shift register 301 in the first shift registers group 310 is electrically connected to a first clock signal line, and the first stage shift register 301 in the second shift registers group 320 is electrically connected to a second clock signal line. A frequency of a clock signal on the first clock signal line and a frequency of a clock signal on the second clock signal line both are ½ of the refresh rate, and the clock signal on the second clock signal line is after the clock signal on the first clock signal line by a refresh cycle.

Based on the above various embodiments, optionally, transistors of the first shift registers group 310 and transistors of the second shift registers group 320 are all P-type transistors. In the (2j+2)th frame, the clock signal on the second clock signal line is a high level signal, such that the second shift registers group 320 is controlled to transmit the disable signal to the scanning line 100 connected to the second group of first sub-pixels 212 and the scanning line 100 connected to the second group of third sub-pixels 232. In the (2j+2)th frame, the clock signal on the first clock signal line is a high level signal, such that the second shift registers group 320 is controlled to transmit the disable signal to the scanning line 100 connected to the first group of first sub-pixels 211 and the scanning line 100 connected to the first group of third sub-pixels 231.

On the basis of the above embodiment, the first sub-pixels and the third sub-pixels are one-side driven, i.e., the scanning line connected to the first sub-pixels or the scanning line connected to the third sub-pixels is connected to only one shift register, therefore, in the scanning drive circuit, a ratio of the number of shift registers in the first shift registers group to the total number of the scanning lines is 2:3, and a ratio of the number of shift registers in the second shift registers group to the total number of the scanning lines is also 2:3. Therefore, a ratio of a width of the shift register in an extending direction of data lines and a width of the sub-pixel in the extending direction of data lines may be 3:2, which is benefit for reducing a width of the shift register in the extending direction of the scanning lines, such that the display panel is further narrowed.

Figure 3:
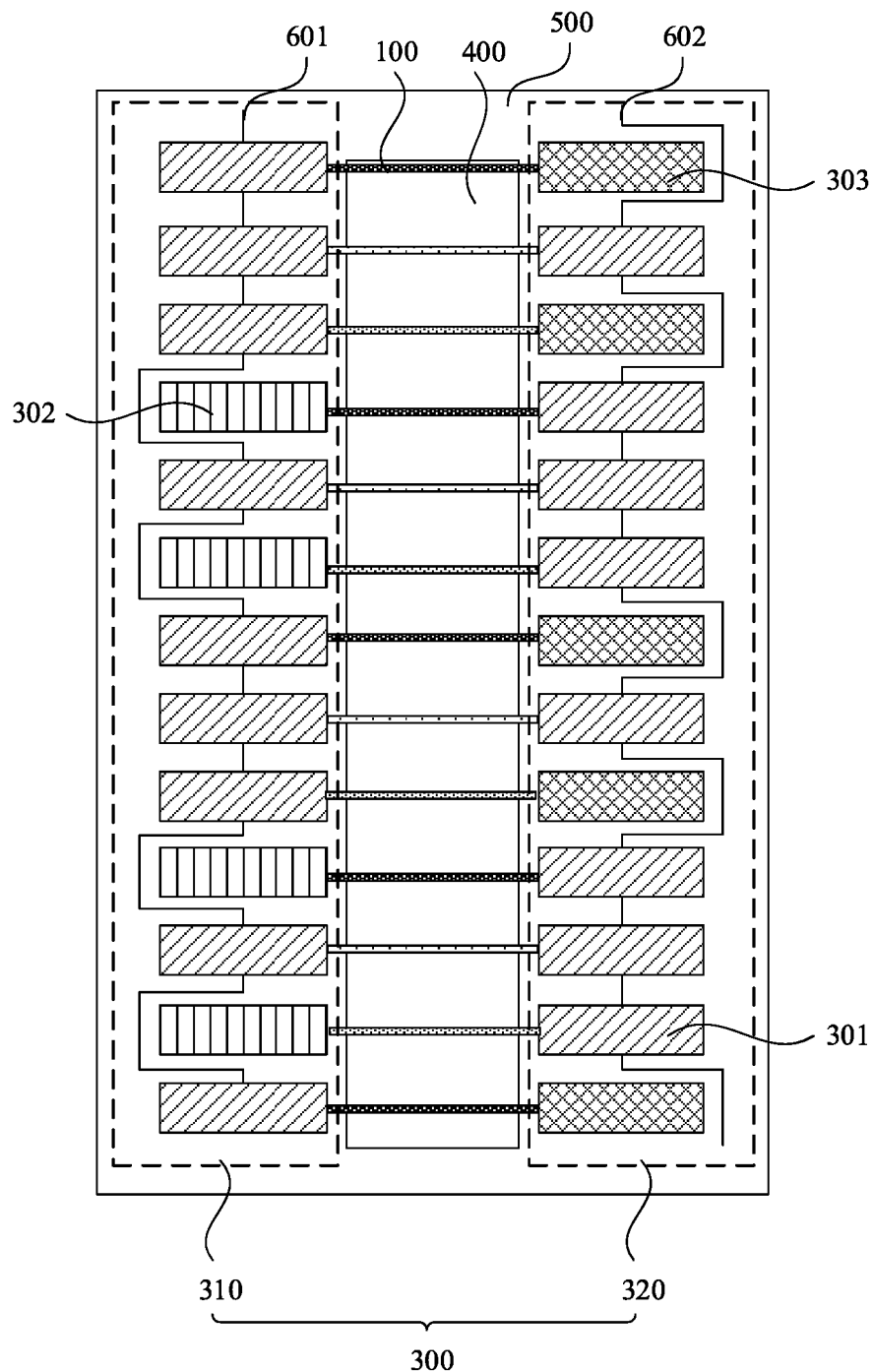
FIG. 3 is top view of another display panel according to an embodiment of the present disclosure.

FIG. 3 is a structural diagram of another display panel according to an embodiment of the present disclosure. Referring to FIG. 3, on the basis of the above various embodiments, optionally, the first shift registers group 310 further includes multiple first dummy shift registers 302, and the multiple first dummy shift registers 302 are electrically connected to the (6k+4)th scanning line 100 and the (6k+6)th scanning line 100 respectively. The second shift registers group 320 further includes multiple second dummy shift registers 303, and the multiple second dummy shift registers 303 are electrically connected to the (6k+1)th scanning line 100 and the (5k+3)th scanning line 100 respectively. In this embodiment, the second dummy shift registers 303 correspond to the first group of first sub-pixels 211 and the first group of third sub-pixels 231, and the first dummy shift register 302 correspond to the second group of first sub-pixels 212 and the second group of third sub-pixels 232, so that the distribution of the shift registers is more even, which facilitates process procedures for making the shift registers such as exposure and development and improves the manufacturing precision.

Referring to FIG. 3, based on the above various embodiments, optionally, the display panel further includes a display area 400 and a non-display area 500. The first shift registers group 310 and the second shift registers group 320 are both located in the non-display area 500. The first shift registers group 310 is disposed at a first side of the display area 400 and the second shift registers group 320 is disposed at a second side of the display area 400. The first side and the second side of the display area 400 may be opposite to each other, for example, the first shift registers group 310 is disposed at the left side of the display area 400 and the second shift registers group 320 is disposed at the right side of the display area 400. In the present embodiment, the first shift registers group 310 and the second shift registers group 320 are respectively disposed on two sides of the display area 400, which facilitates the shift registers group 310 and the second shift registers group 320 connecting to the corresponding scanning lines 100 and facilitates the wiring arrangement of the display panel.

Figure 4:
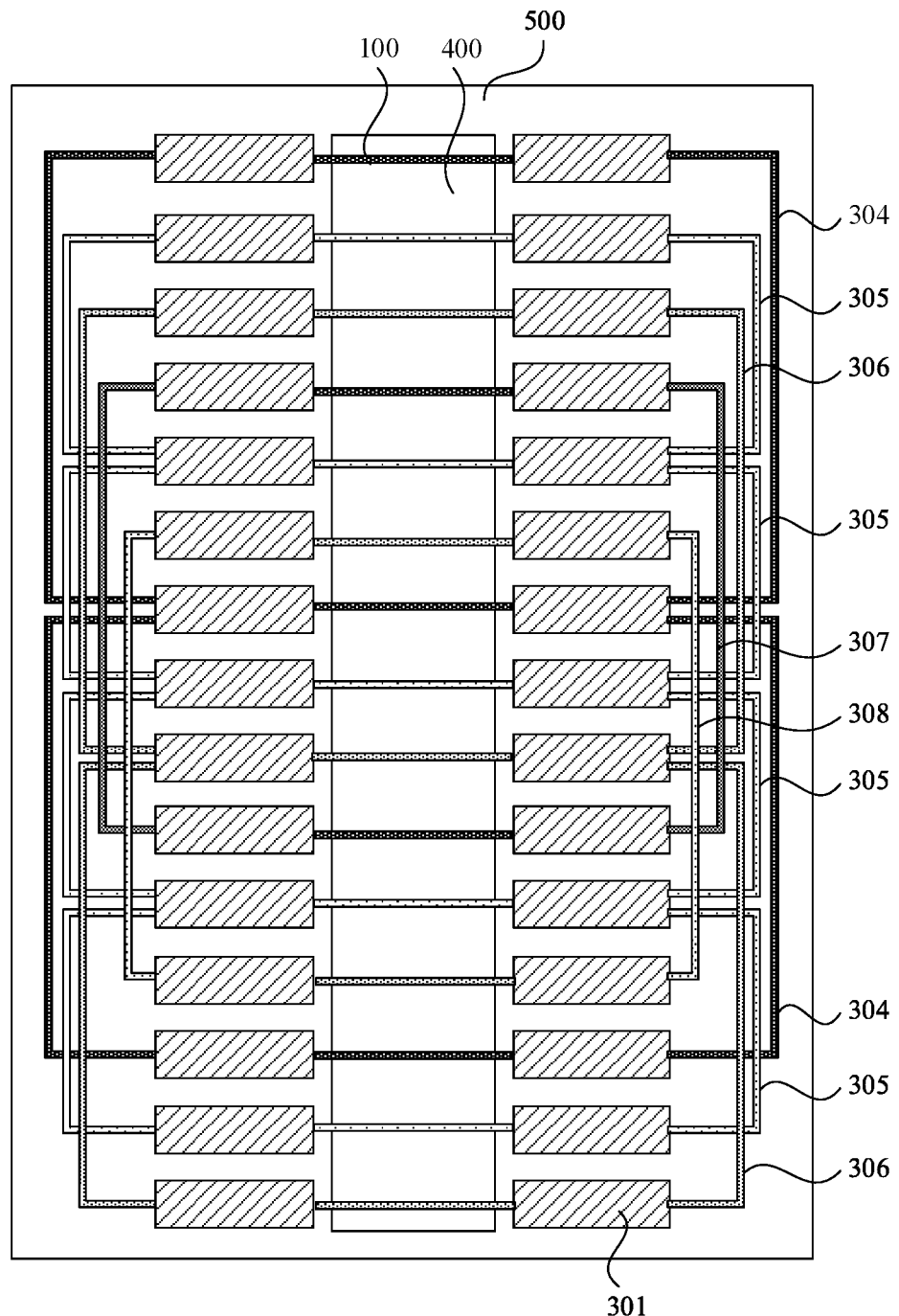
FIG. 4 is top view of a schematic structure diagram of another display panel according to an embodiment of the present disclosure.

FIG. 4 is a top view of schematic diagram of another display panel according to an embodiment of the present disclosure. Referring to FIG. 4, based on the above various embodiments, optionally, the scanning drive circuit 300 includes: a third shift registers group, a fourth shift registers group, a fifth shift registers group, a sixth shift registers group and a seventh shift registers group. The third shift registers group is electrically connected to the scanning line 100 connected to the first group of first sub-pixels 211. The fourth shift registers group is electrically connected to the scanning lines 100 connected to the second sub-pixels 220. The fifth shift registers group is electrically connected to the scanning line 100 connected to the first group of third sub-pixels 231. The sixth shift registers group is electrically connected to the scanning line 100 connected to the second group of first sub-pixels 212. The seventh shift registers group is electrically connected to the scanning line 100 connected to the second group of third sub-pixels 232.

In FIG. 4, exemplarily, shift registers 301 connected to a connection line 304 constitute the third shift registers group, shift registers 301 connected to a connection line 305 constitute the fourth shift registers group, shift registers 301 connected to a connection line 306 constitute the fifth shift registers group, shift registers 301 connected to a connection line 307 constitute the sixth shift registers group, and shift registers 301 connected to a connection line 308 constitute the seventh shift registers group. With such configuration, in the present embodiment, in the (2j+1)th frame, the third shift registers group, the fourth shift registers group and the fifth shift registers group sequentially and respectively drive the first group of first sub-pixels 211, the second sub-pixels 220 and the first group of third sub-pixels 231 to emit light, and in a (2j+2)th frame, the fourth shift registers group, the sixth shift registers group and the seventh shift registers group sequentially and respectively drive the second sub-pixels 220, the second group of first sub-pixels 212, and the second group of third sub-pixels 232 to emit light with the proper type.

Continuously referring to FIG. 4, on the basis of the above various embodiments, optionally, the (6k+1)th scanning line 100 is connected to the first group of first sub-pixels 211, the (6k+2)th scanning line 100 is connected to the second sub-pixels 220, the (5k+3)th scanning line 100 is connected to the first group of third sub-pixels 231, the (6k+4)th scanning line 100 is connected to the second group of first sub-pixels 212, the (6k+5)th scanning line 100 is connected to the second sub-pixels 220, the (6k+6)th scanning line 100 is connected to the second group of third sub-pixels 232; where k is a non-negative integer. In the present embodiment, the first group of first sub-pixels 211, the second sub-pixels 220, the first group of third sub-pixels 231, the second group of first sub-pixels 212, the second sub-pixels 220 and the second group of third sub-pixels 232 are arranged in six rows respectively, and the six rows, as a unit, are repeatedly arranged to form the sub-pixel array of the display panel, the rows of the sub-pixel array are evenly arranged, which facilitates improving the display quality of the display panel.

Referring to FIG. 4, on the basis of the above various embodiments, optionally, the third shift registers group, the fourth shift registers group, the fifth shift registers group, the sixth shift registers group, and the seventh shift registers group each include multiple cascaded shift registers 301. The kth stage shift register 301 in the third shift registers group is electrically connected to the (6k+1)th scanning line 100. The (2k+1)th stage shift register 301 in the fourth shift registers group is electrically connected to the (6k+2)th scanning line 100, and the (2k+2)th stage shift register is electrically connected to the (6k+5)th scanning line 100. The kth stage shift register 301 in the fifth shift registers group is electrically connected to the (5k+3)th scanning line 100. The kth stage shift register 301 in the sixth shift registers group is electrically connected to the (6k+4)th scanning line 100. The kth stage shift register 301 in the seventh shift registers group is electrically connected to the (6k+6)th scanning line 100.

Exemplarily, the drive method for the display panel provided by the embodiment of the present disclosure is as follows. In the (2j+1)th frame, the third shift registers group transmits a scanning signal sequentially to a first scanning line 100, . . . , a (6k+1)th scanning line 100; the fourth shift registers group 320 transmits the scanning signal sequentially to a second scanning line 100, a fifth scanning line 100, . . . , a (6k+2)th scanning line 100 and a (6k+5)th scanning line 100, . . . ; and the fifth shift registers group 320 transmits the scanning signal sequentially to a third scanning line 100, . . . , a (5k+3)th scanning line 100, . . . . Therefore, in the (2j+1)th frame, the third shift registers group, the fourth shift register and the fifth shift registers group sequentially and respectively drive the first group of first sub-pixels 211, the second sub-pixels 220, the first group of third sub-pixels 231 to emit light.

In the (2j+2)th frame, the fourth shift registers group transmits the scanning signal sequentially to the second scanning line 100, the fifth scanning line 100, . . . , the (6k+2)th scanning line 100 and the (6k+5)th scanning line 100, . . . ; the sixth shift registers group transmits the scanning signal sequentially to the fourth scanning line 100, . . . , the (6k+4)th scanning line 100, . . . ; and the seventh shift registers group transmits the scanning signal sequentially to the sixth scanning line 100, . . . , the (6k+6)th scanning line 100, . . . . Therefore, in the (2j+2)th frame, the fourth shift registers group, the sixth shift register and the seventh shift registers group sequentially and respectively drive the second sub-pixels 220, the second group of first sub-pixels 212, the second group of third sub-pixels 232 to emit light.

Referring to FIG. 4, on the basis of the above various embodiments, optionally, the display panel further includes a display area 400 and a non-display area 500. The third shift registers group, the fourth shift registers group, the fifth shift registers group, the sixth shift registers group and the seventh shift registers group are all located in the non-display area 500. In the present embodiment, the third shift registers group, the fourth shift registers group, the fifth shift registers group, the sixth shift registers group and the seventh shift registers group are all integrated with the display panel, which is benefit for reducing the thickness and weight of the display panel.

On the basis of the above various embodiments, optionally, a first stage shift register in the third shift registers group is electrically connected to a third clock signal line, and a first stage shift register in the fourth shift registers group is electrically connected to a fourth clock signal line, a first stage shift register in the fifth shift registers group is electrically connected to a fifth clock signal line, a first stage shift register in the sixth shift registers group is electrically connected to a sixth clock signal line, a first stage shift register in the seventh shift registers group is electrically connected to a seventh clock signal line. The clock signal on the third clock signal line and the clock signal on the fifth clock signal line are valid only in odd frames, the clock signal on the sixth clock signal line and the clock signal on the seventh clock signal line are valid only in even frames, and the clock signal on the fourth clock signal line is valid in both odd frames and even frames.

It is to be noted that the connection manner of the third shift registers group, the fourth shift registers group, the fifth shift registers group, the sixth shift registers group and the seventh shift registers group in the above embodiment is exemplary and illustrative, which is not intended to limit the present disclosure. In other embodiments, a last stage shift register in the third shift registers group may be electrically connected to the first stage shift register in the fifth shift registers group; and a last stage shift register in the sixth shift registers group is electrically connected to the first stage shift register in the seventh shift registers group. The connection may also be configured as needed in actual application.

Referring to FIG. 4, on the basis of the above various embodiments, optionally, the display panel provided by the embodiment of the present disclosure may adopt a two-side drive method. The third shift registers group includes a first sub-group and a second sub-group, the fourth shift registers group includes a first sub-group and a second sub-group, the fifth shift registers group includes a first sub-group and a second sub-group, and the sixth shift registers group includes a first sub-group and a second sub-group.

A first end of the (6k+1)th scanning line 100 is connected to a kth stage shift register 301 in the first sub-group of the third shift registers group, and a second end of the (6k+1)th scanning line 100 is connected to a kth stage shift register 301 in the second sub-group of the third shift registers group. The first sub-group and the second sub-group of the third shift registers group transmit the same scanning signal to the (6k+1)th scanning line 100.

A first end of the (6k+2)th scanning line 100 is connected to a (2k+1)th stage shift register 301 in the first sub-group of the fourth shift registers group, and a second end of the (6k+2)th scanning line 100 is connected to a (2k+1)th stage shift register 301 in the second sub-group of the fourth shift registers group. A first end of the (6k+5)th scanning line 100 is connected to a (2k+2)th stage shift register 301 in the first sub-group of the fourth shift registers group, and a second end is connected to a (2k+2)th stage shift register 301 in the second sub-group of the fourth shift registers group. The first sub-group and the second sub-group of the fourth shift registers group transmit the same scanning signal to the (6k+1)th scanning line 100, and the first sub-group and the second sub-group of the fourth shift registers group transmit the same scanning signal to the (6k+5)th scanning line 100.

A first end of the (5k+3)th scanning line 100 is connected to a kth stage shift register 301 in the first sub-group of the fifth shift registers group, and a second end is connected to a kth stage shift register 301 in the second sub-group of the fifth shift registers group. The first sub-group and the second sub-group of the fifth shift registers group transmit the same scanning signal to the (5k+3)th scanning line 100.

A first end of the (6k+4)th scanning line 100 is connected to a kth stage shift register 301 in the first sub-group of the sixth shift registers group, and a second end of the (6k+4)th scanning line 100 is connected to a kth stage shift register 301 in the second sub-group of the sixth shift registers group. The first sub-group and the second sub-group of the sixth shift registers group transmit the same scanning signal to the (6k+4)th scanning line 100.

A first end of the (6k+6)th scanning line 100 is connected to a kth stage shift register 301 in the first sub-group of the seventh shift registers group, and a second end of the (6k+6)th scanning line 100 is connected to a kth stage shift register 301 in the second sub-group of the seventh shift registers group. The first sub-group and the second sub-group of the seventh shift registers group transmit the same scanning signal to the (6k+6)th scanning line 100.

It is to be noted that in the above various embodiments, exemplarily, the number of first sub-pixels 211 in the first group of first sub-pixels and the number of first sub-pixels 211 in the second group of first sub-pixels 212 are both half of the number of the first sub-pixels 210; and the number of third sub-pixels 232 in the first group of third sub-pixels and the number of third sub-pixels 232 in the second group of third sub-pixels 232 are both half of the number of the third sub-pixels 230, which is not intended to limit the present disclosure. In other embodiments, the number of first sub-pixels 231 in the first group of first sub-pixels may be different from the number of first sub-pixels 231 in the second group of first sub-pixels, and the number of third sub-pixels 231 in the first group of third sub-pixels is different from the number of third sub-pixels 231 in the second group of third sub-pixels 232, which may also be configured as needed in actual application.

It is to be further noted that, in the above various embodiments, the refresh rate of the first sub-pixels 210 and the refresh rate of the third sub-pixels 230 are both half of the refresh rate of the second sub-pixels 220, which is not intended to limit the present disclosure. In other embodiments, the refresh rate of the first sub-pixels 210 and the refresh rate of the third sub-pixels 230 may be configured to be less than or equal to half of the refresh rate of the second sub-pixels 220, which also be configured as needed in actual application.

Figure 5:
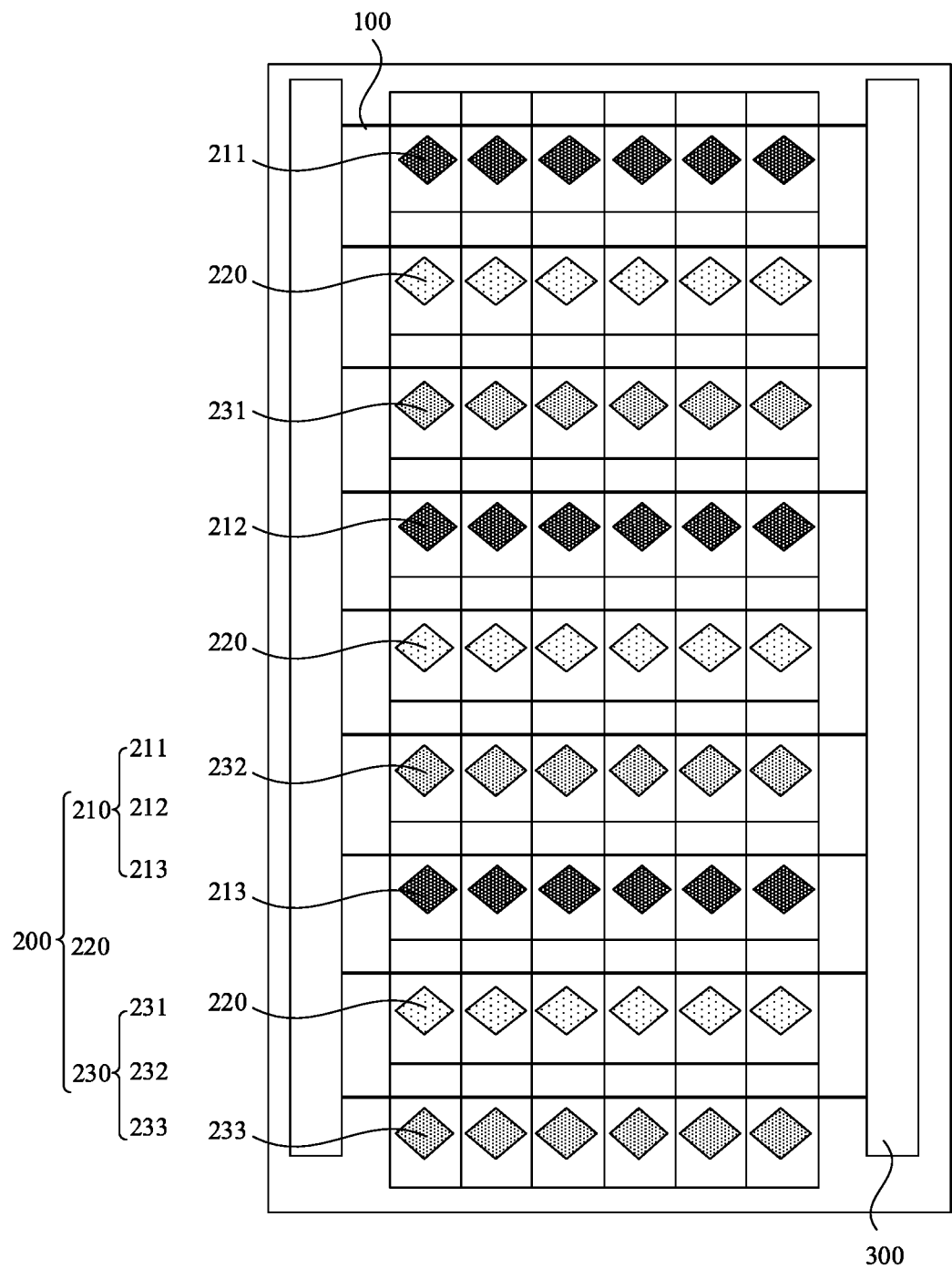
FIG. 5 is top view of a schematic structure diagram of yet another display panel according to an embodiment of the present disclosure.

FIG. 5 is a structural diagram of another display panel according to an embodiment of the present disclosure. Referring to FIG. 5, on the basis of the above various embodiments, optionally, the first sub-pixels 210 further include a third group of first sub-pixels 213; and the third sub-pixels further include a third group of third sub-pixels 233. The scanning drive circuit 300 is used for driving the first group of the first sub-pixels 211, the second sub-pixels 220 and the first group of the third sub-pixels 231 to emit light in a (3p+1)th frame, driving the second group of the first sub-pixels 212, the second sub-pixels 220 and the second group of the third sub-pixels 232 to emit light in a (3p+2)th frame; and driving the third group of the first sub-pixels 213, the second sub-pixels 220 and the third group of the third sub-pixels 233 to emit light in a (3p+3)th frame; where p is a non-negative integer.

Exemplarily, the drive method for the display panel is as follows. In the (3p+1)th frame, the scanning drive circuit 300 transmits a scanning signal sequentially to the scanning line 100 connected to the first group of first sub-pixels 211, the scanning lines 100 connected to the second sub-pixels 220 and the scanning line 100 connected to the first group of third sub-pixels 231 so as to drive the first group of first sub-pixels 211, the second sub-pixels 220 and the first group of third sub-pixels 231 to emit light.

In the (3p+2)th frame, the scanning drive circuit 300 transmit the scanning signal sequentially to the scanning line 100 connected to the second group of first sub-pixels 212, the scanning lines 100 connected to the second sub-pixels 220 and the scanning line connected to the second group of third sub-pixels 232 so as to drive the second group of first sub-pixels 212, the second sub-pixels 220 and the second group of third sub-pixels 232 to emit light.

In the (3p+3)th frame, the scanning drive circuit 300 transmits the scanning signal sequentially to the scanning line 100 connected to the third group of first sub-pixels 213, the scanning lines 100 connected to the second sub-pixels 220 and the scanning line connected to the third group of third sub-pixels 233 so as to drive the third group of first sub-pixels 213, the second sub-pixels 220 and the third group of third sub-pixels 233 to emit light.

In the embodiment of the present disclosure, the second sub-pixels 220 are not divided into groups, the scanning drive circuit 300 may drive all second sub-pixels 220 to emit light in each frame. The embodiment of the present disclosure exemplarily divides the first sub-pixels 210 into three groups, which are the first group of first sub-pixels 211, the second group of first sub-pixels 212 and the third group of first sub-pixels 213. The first group of first sub-pixels 211 emits light in the (3p+1) frame, the second group of first sub-pixels 212 emits light in the (3p+2) frame and the third group of first sub-pixels emits light in the (3p+3) frame. Similarly, the embodiment of the present disclosure exemplarily divides the third sub-pixels 230 into three groups, which are the first group of third sub-pixels 231, the second group of third sub-pixels 232 and the third group of third sub-pixels 233. The first group of third sub-pixels 231 emits light in the (3p+1) frame, the second group of third sub-pixels 232 emits light in the (3p+2) frame and the third group of third sub-pixels emits light in the (3p+3) frame. Therefore, the embodiment of the present disclosure reduces the line scanning frequency, the refresh rate of the first sub-pixels 210 and the refresh rate of the third sub-pixels 230 are ⅓ of the refresh rate of the second sub-pixels. For a display panel whose resolution is N rows and M columns, in each frame, only ⅝ of the N rows of sub-pixels 200 are scanned, that is, only ⅝ of the N rows of sub-pixels 200 are charged and discharged.

Based on the above various embodiments, optionally, the second sub-pixels 220 are green sub-pixels, the first sub-pixels 210 are red sub-pixels, and the third sub-pixels 230 are blue sub-pixels. Alternatively, the second sub-pixels 220 are green sub-pixels, the first sub-pixels 210 are blue sub-pixels, and the third sub-pixels 230 are red sub-pixels.

The brightness of the display screen is reflected by green sub-pixels. From the perspective of the viewing experience of the display screen, human eyes are more sensitive to the brightness. Therefore, compared with the red sub-pixel and blue sub-pixel, the human eyes are more sensitive to the number of the green sub-pixels emitting light. In the embodiment of the present disclosure, the second sub-pixels 220 are green sub-pixels, that is, the number of the green sub-pixels emitting light is constant in each frame, while the numbers of the red sub-pixels emitting light and the number of the blue sub-pixels emitting light are reduced, which may further reduce the influence to the display quality.

In the above various embodiments, the sub-pixels 200 may be arranged in various manners, several arrangement manners are described below in detail, but the present disclosure is not limited to these arrangement manners.

Continuing to refer to FIG. 5, based on the above various embodiments, optionally, the scanning lines 100 extend along a row direction; and multiple sub-pixels 200 are arranged in an array. A row of sub-pixels 200 are of the same type, and a column of sub-pixels 200 includes the first sub-pixel 210, the second sub-pixel 220 and the third sub-pixel 230 disposed alternately.

Sub-pixels 200 in the same row are of the same type, such that one scanning line 100 drives sub-pixels 200 of the same type. The first sub-pixel 210, the second sub-pixel 220 and the third sub-pixel 230 are disposed alternately, i.e., three types of the sub-pixels 200 are sequentially and repeatedly arranged with three rows as a repeating unit. Exemplarily, the first row of sub-pixels 200 is the first group of first sub-pixels 211; the second row of sub-pixels 200 is second sub-pixels 220; the third row of sub-pixels 200 is the first group of third sub-pixels 231; the fourth row of the sub-pixels 200 is the second group of first sub-pixels 212; the fifth row of sub-pixels 200 is second sub-pixels 220; and the sixth row of sub-pixels 200 is the second group of third sub-pixels 232. In the embodiment of the present disclosure, three types of the sub-pixels 200 are sequentially and repeatedly arranged with three rows as a repeating unit. The arrangement is simple and facilitates the fabrication of the connection lines of the sub-pixels 200.

Figure 6:
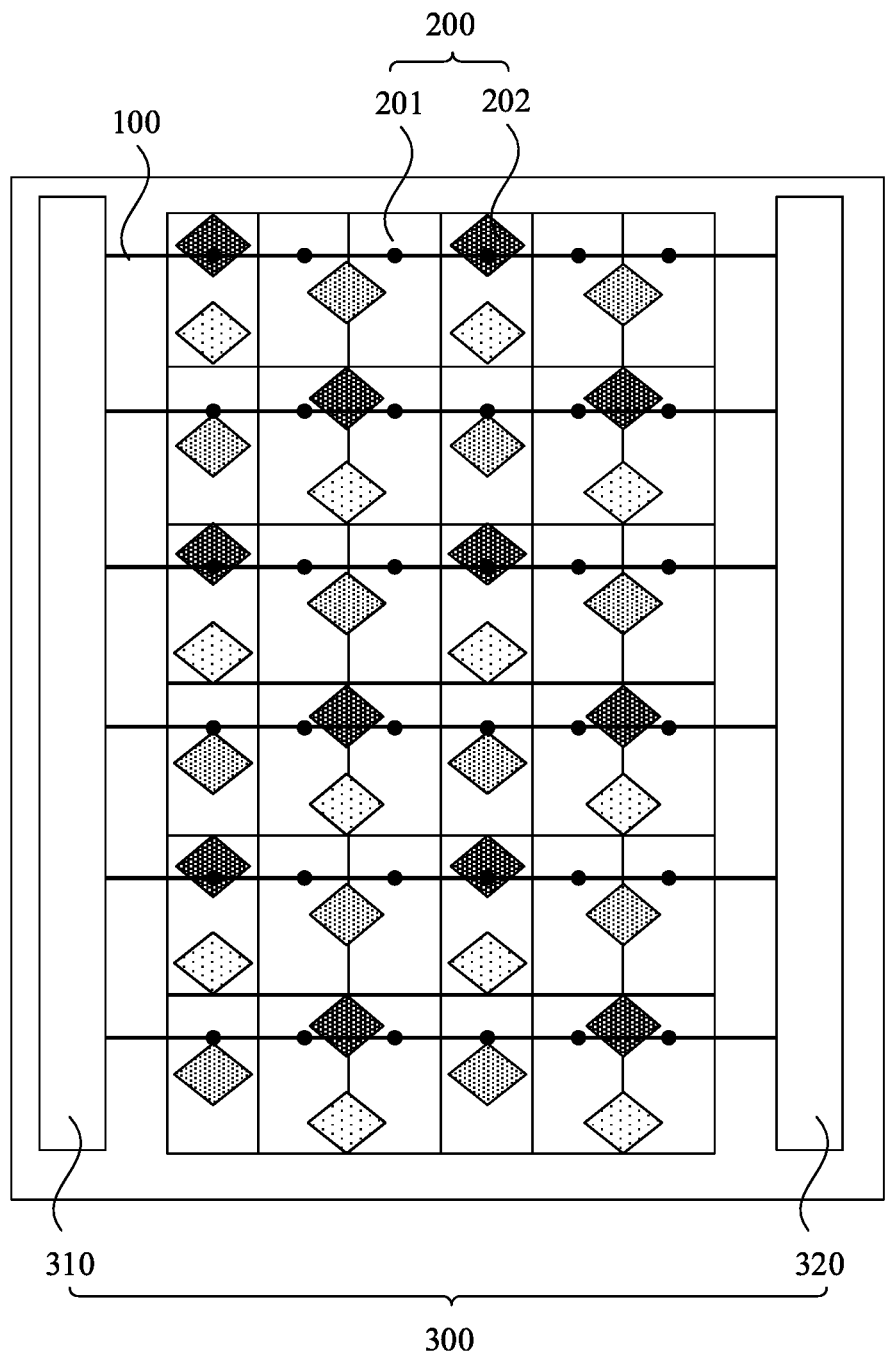
FIG. 6 is top view of a schematic structure diagram of yet another display panel according to an embodiment of the present disclosure.

FIG. 6 is a structural diagram of another display panel according to an embodiment of the present disclosure. Referring to FIG. 6, based on the above various embodiments, optionally, the scanning lines 100 extend along a row direction. Each of the multiple sub-pixels 200 includes a pixel circuit 201 and a light-emitting unit 202. The pixel circuits 201 of the multiple sub-pixels are arranged in an array, and the array of the pixel circuits 201 includes N1 rows and M1 columns, where N1 and M1 are both positive integers. The light-emitting units 202 of the multiple sub-pixels are arranged in an array, and the array of the light-emitting units 202 includes N2 rows and M2 columns, where N2 and M2 are both positive integers. N1×M1=N2×M2, N1≠N2, M1≠M2.

Each of the scanning lines 100 is electrically connected to a corresponding pixel circuit 201 and transmits the scanning signal to the corresponding pixel circuit 201, and the pixel circuit 201 provides a drive current to the corresponding light emitting unit 202. Exemplarily, the number of the rows of the array of the pixel circuits 201 is equal to the number of the scanning lines 100, and each scanning line 100 is electrically connected to a corresponding row of pixel circuits 201. N1×M1=N2×M2, N1≠N2, M1≠M2, that is, the pixel arrangement adopts a row quantity increasing arrangement, the number of the rows of the light emitting units 202 is increased, so that the number of rows of the light emitting units 202 is greater than the number of rows of the pixel circuits 201, and the number of columns of the light emitting units 202 is less than the number of columns of the pixel circuits 201. Therefore, with the row quantity increasing arrangement, the distance between adjacent columns of light emitting units is increased, thereby reducing the difficulty of the mask of the evaporation process and enabling the display panel to keep a higher resolution.

The first sub-pixels include first light emitting units, the second sub-pixels include second light emitting units, and the third sub-pixels include third light emitting units. The (3i+1)th row of the light emitting units 202 includes the first light emitting units and the third light emitting units disposed alternately, and the (3i+2)th row of the light emitting units 202 includes the second light emitting units and the first light emitting units disposed alternately, and the (3i+3)th row of the light emitting units 202 includes the third light emitting units and the second light emitting units disposed alternately; where i is a non-negative integer.

The pixel circuits 201 in the (3q+1)th row are connected to the first light emitting units, the pixel circuits 201 in the (3q+2)th row are connected to the second light emitting units, the pixel circuits 201 in the (3q+3)th row are connected to the third light emitting units, and q is a non-negative integer. For example, the pixel circuits 201 in the (3q+1)th row are electrically connected to the first light emitting unit in the (5q+1)th row, the first light emitting unit in the (5q+4)th row, and the first light emitting unit in the (5q+2)th row separately; the pixel circuits 201 in the (3q+2)th row are electrically connected to the second light emitting unit in the (5q+2)th row, the second light emitting unit in the (5q+5)th row, and the second light emitting unit in the (5q+3)th row separately; and the pixel circuits 201 in the (3q+3)th row are electrically connected to the third light emitting unit in the (5q+3)th row, the third light emitting unit in the (5q+1)th row, and the third light emitting unit in the (5q+4)th row separately.

It is noted that since a distance between the pixel circuit 201 and the corresponding light emitting unit 202 is relatively large, the pixel circuit 201 and the corresponding light emitting unit 202 are connected by a connection line (which is shown in FIG. 6). Exemplarily, an insulating layer and an auxiliary wire layer are disposed on a drive array layer including the pixel circuits 201. The insulating layer and the auxiliary wire layer are disposed between the drive array layer and a planarization layer. The insulating layer includes first via holes, the auxiliary wire layer includes multiple auxiliary wires, and the planarization layer includes second via holes. The auxiliary wire is electrically connected to the corresponding pixel circuit 201 through the first via hole and electrically connected to the corresponding light emitting unit 202 through the second via hole, such that the light emitting unit 202 is electrically connected to the corresponding pixel circuit 201 through the second via hole, the auxiliary wire, and the first via hole. In the embodiment of the present disclosure, with the configuration of the insulating layer and the auxiliary wire layer, the first via hole is moved down, avoiding that the connection line passes through other light emitting units 202. The second via hole in the planarization layer may be flexibly configured according to the position of the light emitting unit 202 to avoid the position of the light emitting unit 202, thereby ensuring the row quantity increasing arrangement without changing an aperture ratio.

In the embodiment of the present disclosure, the pixels are arranged in a row quantity increasing manner, and the drive method may adopt the pseudo frame frequency drive method provided by the embodiment of the present disclosure, so that the display panel has the advantages of high resolution, low power consumption, simple manufacturing process and low manufacturing cost at the same time.

On the basis of the above various embodiments, optionally, the display panel is at least one of: an organic light emitting diode (OLED) display panel, a liquid crystal display (LCD) panel, a micro light emitting diode (Micro LED) display panel, or an electrophoresis display (EPD) panel.

Since the OLED display panel has the advantages of self-luminous, high contrast, small thickness, wide viewing angle, fast response, available for flexible panels, wide working temperature range, simple structure and process, the OLED display is considered as a new application technology of the next generation of flat panel display devices. However, compared with other types of display panels, the OLED display panel has a higher power consumption, which limits its application range. The power consumption can be reduced by applying the solutions of the embodiment of the present disclosure to the OLED display panel, which facilitates further expanding the application range of the OLED display panel.

Figure 7:
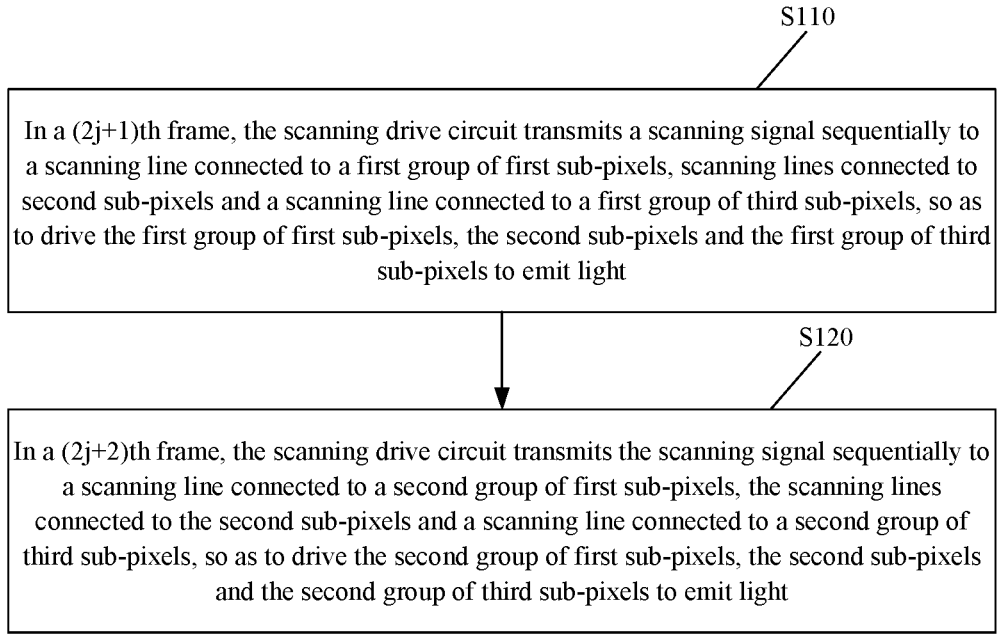
FIG. 7 is a flowchart of a method for driving a display panel according to an embodiment of the present disclosure.

An embodiment of the present disclosure further provides a method for driving a display panel. FIG. 7 is a flowchart of a method for driving a display panel according to an embodiment of the present disclosure. The display panel includes multiple scanning lines, multiple sub-pixels electrically connected to the multiple scanning lines and a scanning drive circuit. The multiple sub-pixels include: first sub-pixels, second sub-pixels and third sub-pixels. Each of the multiple scanning lines is connected to sub-pixels of the same type. The first sub-pixels include a first group of first sub-pixels and a second group of first sub-pixels, and the third sub-pixels include a first group of third sub-pixels and a second group of third sub-pixels. The scanning drive circuit is electrically connected to the multiple scanning lines separately.

Referring to FIG. 7, the method for driving the display panel includes the steps described below.

In step S110, in a (2j+1)th frame (an odd frame), the scanning drive circuit is driven to transmit a scanning signal sequentially to the scanning line connected to the first group of first sub-pixels, scanning lines connected to second sub-pixels and the scanning line connected to a first group of third sub-pixels, such that the first group of first sub-pixels, the second sub-pixels and the first group of third sub-pixels are driven to emit light.

In step S120, in a (2j+2)th frame (an even frame), the scanning drive circuit is driven to transmit the scanning signal sequentially to the scanning line connected to the second group of first sub-pixels, the scanning lines connected to the second sub-pixels and the scanning line connected to the second group of third sub-pixels, such that the second group of first sub-pixels, the second sub-pixels and the second group of third sub-pixels are driven to emit light. j is a non-negative integer.

The embodiment of the present disclosure provides a pseudo frame frequency drive method for the display panel. The scanning drive circuit drives the second sub-pixels to emit light in each frame, drives the first group of first sub-pixels and the first group of third sub-pixels to emit light in odd frames, and drives the second group of first sub-pixels and the second group of third sub-pixels to emit light in even frames. Compared with the related art, the embodiments of the present disclosure reduce the number of the sub-pixels emitting light when the display screen is refreshed, thereby reducing the power required by charging and discharging of the sub-pixels and reducing the power consumption of the display panel. Also, in the embodiments of the present disclosure, the number of the second sub-pixels driven to emit light in each frame is not changed compared with the related art. Therefore, an overall refresh rate of the display panel is not changed, the influence to the display quality is small and the method is suitable to the display device with a higher drive frequency such as VR display device.

There are multiple specific implementations of driving the scanning drive circuit to drive the first group of first sub-pixels, the second sub-pixels and the first group of third sub-pixels to emit light, and drive the second group of first sub-pixels, the second sub-pixels and the second group of third sub-pixels to emit light. Several implementations are described below, but the present disclosure is not limited to these implementations.

Figure 8:
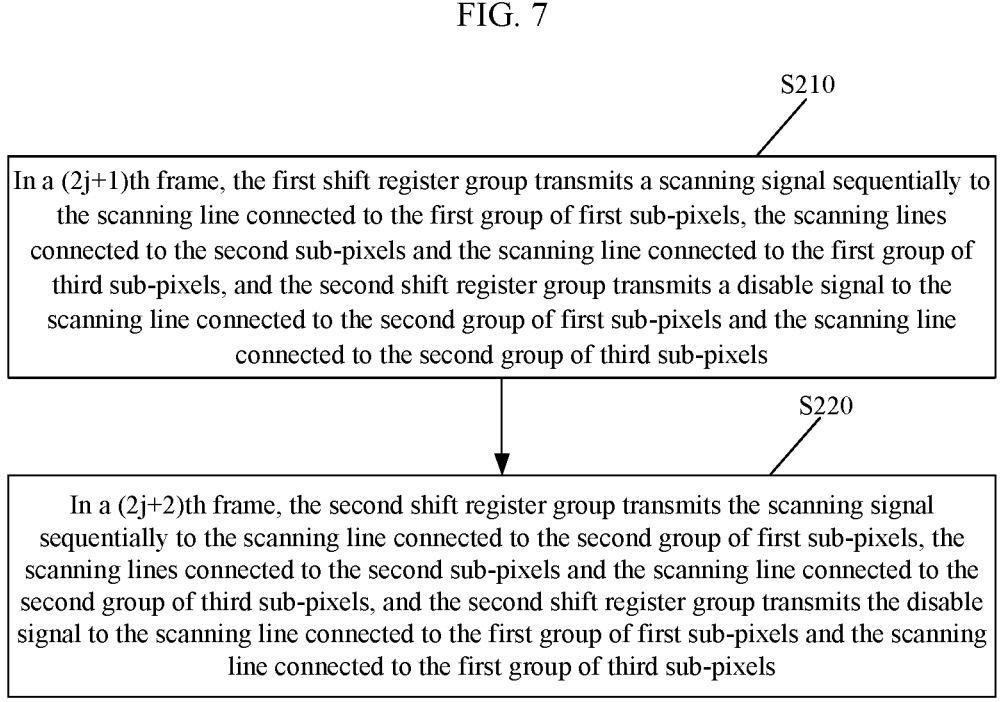
FIG. 8 is a flowchart of another method for driving a display panel according to embodiment of the present disclosure.

FIG. 8 is a flowchart of a method for driving a display panel according to another embodiment of the present disclosure. On the basis of the above various embodiments, optionally, the scanning drive circuit includes a first shift registers group and a second shift registers group; the first shift registers group is electrically connected to the first group of first sub-pixels, second sub-pixels and the first group of third sub-pixels separately; and the second shift registers group is electrically connected to the second group of first sub-pixels, the second sub-pixels and the second group of third sub-pixels separately.

A (6k+1)th scanning line is connected to the first group of first sub-pixels, a (6k+2)th scanning line is connected to second sub-pixels, a (5k+3)th scanning line is connected to the first group of third sub-pixels, a (6k+4)th scanning line is connected to the second group of first sub-pixels, a (6k+5)th scanning line is connected to second sub-pixels, a (6k+6)th scanning line is connected to the second group of third sub-pixels; where k is a non-negative integer.

Referring to FIG. 8, the method for driving the display panel includes the steps described below.

In step S210, in the (2j+1)th frame, the first shift registers group is driven to transmit a scanning signal sequentially to the scanning line connected to the first group of first sub-pixels, the scanning lines connected to the second sub-pixels and the scanning line connected to the first group of third sub-pixels, and the second shift registers group is driven to transmit a disable signal to the scanning line connected to the second group of first sub-pixels and the scanning line connected to the second group of third sub-pixels.

In step S220, in the (2j+2)th frame, the second shift registers group is driven to transmit the scanning signal sequentially to the scanning line connected to the second group of first sub-pixels, the scanning lines connected to the second sub-pixels and the scanning line connected to the second group of third sub-pixels, and the first shift registers group is driven to transmit the disable signal to the scanning line connected to the first group of first sub-pixels and the scanning line connected to the first group of third sub-pixels.

Figure 9:
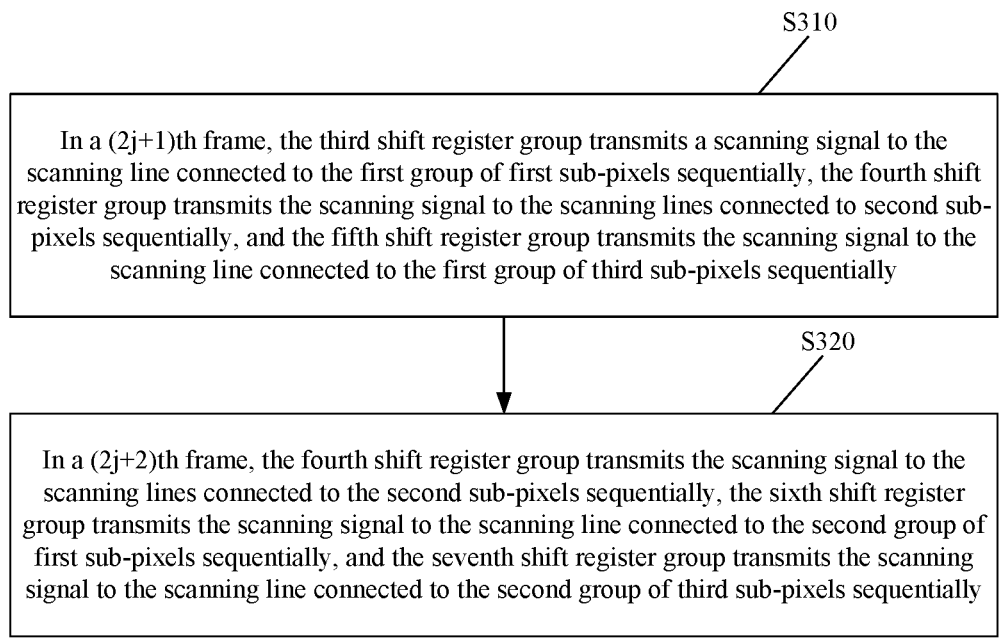
FIG. 9 is a flowchart of another method for driving a display panel according to embodiment of the present disclosure.

FIG. 9 is a flowchart of another method for driving a display panel according to another embodiment of the present disclosure. Based on the above various embodiments, optionally, the scanning drive circuit includes a third shift registers group, a fourth shift registers group, a fifth shift registers group, a sixth shift registers group and a seventh shift registers group. The third shift registers group is electrically connected to the first group of first sub-pixels; the fourth shift registers group is electrically connected to the second sub-pixels; the fifth shift registers group is electrically connected to the first group of third sub-pixels; the sixth shift registers group is electrically connected to the second group of first sub-pixels and the seventh shift registers group is electrically connected to the second group of third sub-pixels.

A (6k+1)th scanning line is connected to the first group of first sub-pixels, a (6k+2)th scanning line is connected to second sub-pixels, a (5k+3)th scanning line is connected to the first group of third sub-pixels, a (6k+4)th scanning line is connected to the second group of first sub-pixels, a (6k+5)th scanning line is connected to second sub-pixels, a (6k+6)th scanning line is connected to the second group of third sub-pixels; where k is a non-negative integer.

Referring to FIG. 9, the method for driving the display panel includes the steps described below.

In step S310, in the (2j+1)th frame, the third shift registers group is driven to transmit a scanning signal to the scanning line connected to the first group of first sub-pixels according to j=1, 2, 3, . . . sequentially, the fourth shift registers group is driven to transmit the scanning signal to the scanning lines connected to the second sub-pixels sequentially, and the fifth shift registers group is driven to transmit the scanning signal to the scanning line connected to the first group of third sub-pixels.

In step S320, in the (2j+2)th frame, the fourth shift registers group is driven to transmit the scanning signal to the scanning lines connected to the second sub-pixels sequentially with time, the sixth shift registers group is driven to transmit the scanning signal to the scanning line connected to the second group of the first sub-pixels, and the seventh shift registers group is driven to transmit the scanning signal to the scanning line connected to the second group of the third sub-pixels.

On the basis of the above various embodiments, optionally, the number of the first sub-pixels in the first group of first sub-pixels and the number of the first sub-pixels in the second group of first sub-pixels are half of the number of the first sub-pixels; and the number of third sub-pixels in the first group of third sub-pixels and the number of third sub-pixels in the second group of third sub-pixels are half of the number of the third sub-pixels.

It is to be further noted that, in the above various embodiments, the refresh rate of the first sub-pixels 210 and the refresh rate of the third sub-pixels 230 are both half of the refresh rate of the second sub-pixels 220, which is not intended to limit the present disclosure. In other embodiments, the refresh rate of the first sub-pixels 210 and the refresh rate of the third sub-pixels 230 may be configured to be less than or equal to half of the refresh rate of the second sub-pixels 220, which also be configured as needed in actual application.

Figure 10:
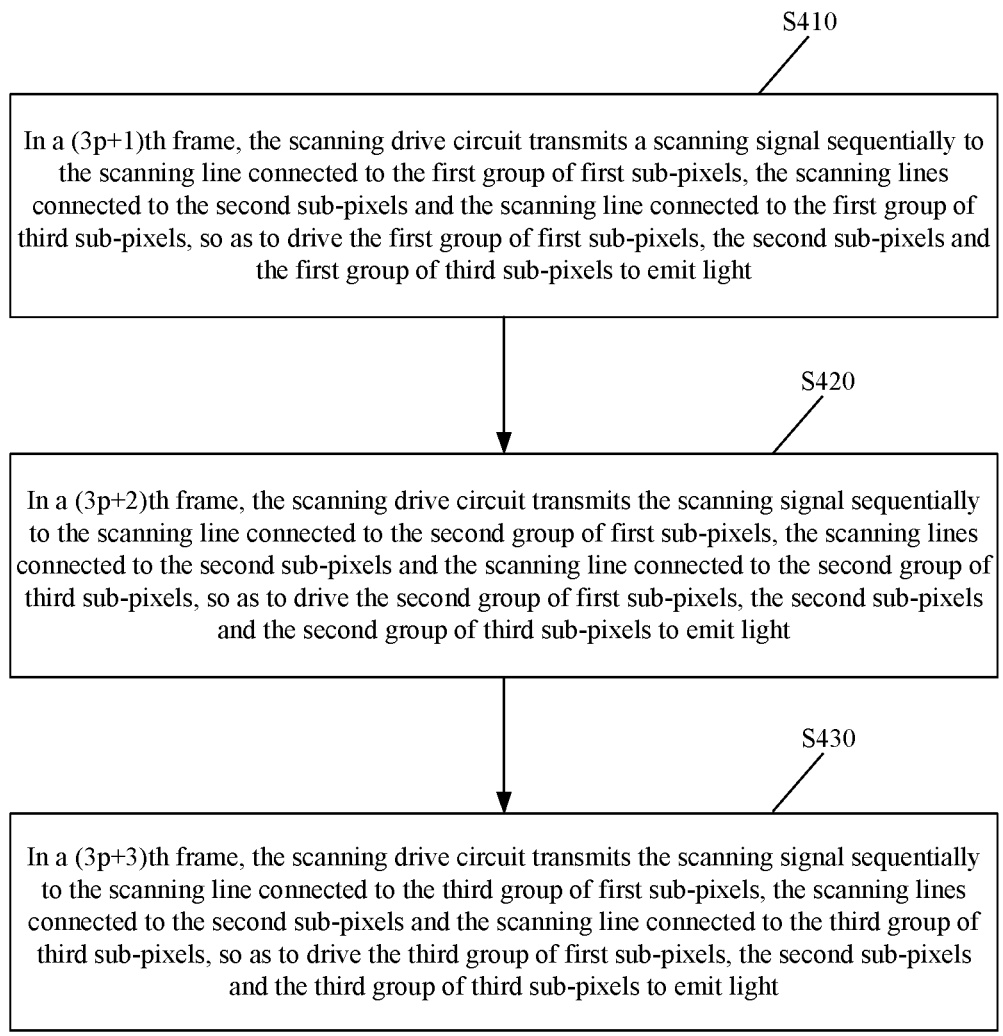
FIG. 10 is a flowchart of another method for driving a display panel according to embodiment of the present disclosure.

FIG. 10 is a flowchart of another method for driving a display panel according to an embodiment of the present disclosure. Based on the above embodiments, optionally, the first sub-pixels further include a third group of first sub-pixels; and third sub-pixels further include a third group of third sub-pixels.

Referring to FIG. 10, the method for driving the display panel includes the steps described below.

In step S410, in a (3p+1)th frame, the scanning drive circuit is driven to transmit a scanning signal sequentially with time to the scanning line connected to the first group of first sub-pixels, the scanning lines connected to second sub-pixels, and the scanning line connected to the first group of third sub-pixels, such that the first group of first sub-pixels, the second sub-pixels and the first group of third sub-pixels are driven to emit light.

In step S420, in a (3p+2)th frame, the scanning drive circuit is driven to transmit the scanning signal sequentially with time to the scanning line connected to the second group of first sub-pixels, the scanning lines connected to the second sub-pixels and the scanning line connected to the second group of third sub-pixels, such that the second group of first sub-pixels, the second sub-pixels and the second group of third sub-pixels are driven to emit light.

In step S430, in a (3p+3)th frame, the scanning drive circuit is driven to transmit the scanning signal sequentially with time to the scanning line connected to the third group of first sub-pixels, the scanning lines connected to the second sub-pixels and the scanning line connected to the third group of third sub-pixels, such that the third group of first sub-pixels, the second sub-pixels and the third group of third sub-pixels are driven to emit light.

In the present embodiment, the first sub-pixels are divided into three groups. The scanning drive circuit drives the three groups of the first sub-pixels to emit light in three frames separately. The third sub-pixels are divided into three groups, and the scanning drive circuit drives the three groups of the third sub-pixels to emit light in three frames separately. Such configuration in the embodiment of the present disclosure reduces the line scanning frequency, so that the refresh rate of the first sub-pixels and the refresh rate of the third sub-pixels are ⅓ of the refresh rate of the second sub-pixels.

Figure 11:
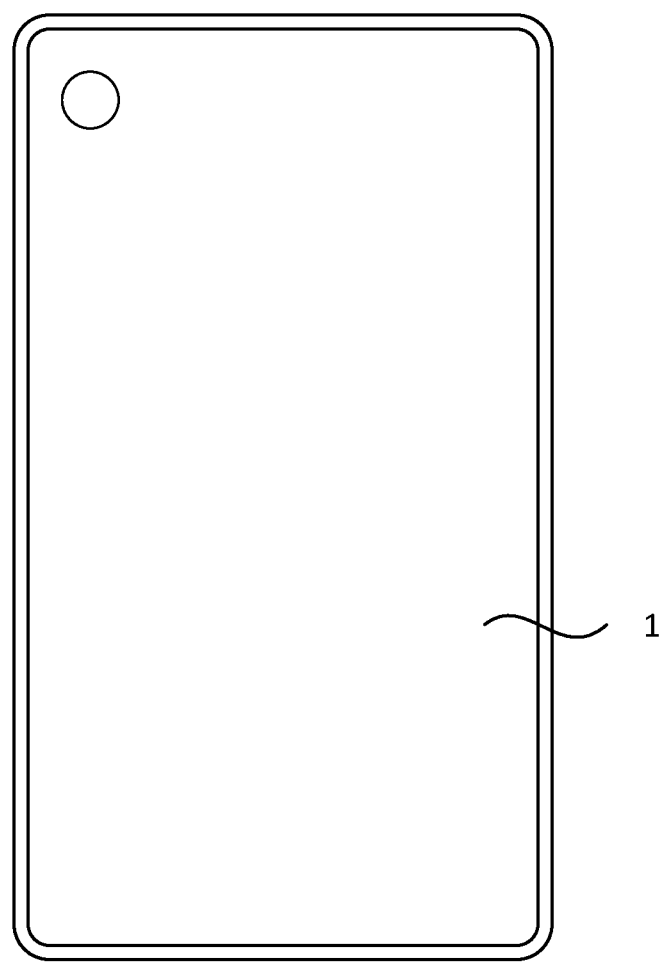
FIG. 11 is a structural diagram of a display device according to an embodiment of the present disclosure.

An embodiment of the present disclosure further provides a display device. FIG. 11 is a structural diagram of the display device according to an embodiment of the present disclosure. Referring to FIG. 11, the display device includes the display panel of any one of embodiments of the present disclosure. The display device may be such as a VR device, a mobile phone, a tablet computer, a wearable device, a television or an information inquiry machine, etc.

The display device further includes a driver chip. The driver chip may be disposed on the display panel or disposed on the back of the display panel. The driver chip is electrically connected to the scan driving circuit for providing a control signal or a power supply signal to the scan driving circuit. The number of the driver chips may be set as needed. Exemplarily, the display device includes two driver chips. One of the two driver chips provides the first clock signal to the first shift registers group, and the other one provides the second clock signal to the second shift registers group. Alternatively, the display device includes one driver chip. The one driver chip includes two clock signal output ends. One of the two clock signal output ends provides the first clock signal to the first shift registers group, and the other one provides the second clock signal to the second shift registers group The embodiments of the present disclosure provide a display panel suitable for RGB hybrid frame rate driving. Sub-pixels connected to one scanning line belong to the same type. The scanning drive circuit drives the second sub-pixels to emit light at every frame, drives the first group of the first sub-pixels and the first group of the third sub-pixels to emit light at odd frames, and drives the second group of the first sub-pixels and the second group of the third sub-pixels to emit light at even frames. Compared with the related art, the embodiments of the present disclosure reduce the number of the sub-pixels which emit light when the display screen is refreshed, thereby reducing the power required for charging and discharging the sub-pixels and reducing the power consumption of the display panel. Moreover, in the embodiments of the present disclosure, the number of the second sub-pixels driven to emit light in each frame is not changed compared with the related art. Therefore, an overall refresh rate of the display screen is not changed, the influence to the display quality is small. The embodiments of the present disclosure can be better applied to display panels with higher drive frequency such as the virtual reality display panel.

It is to be noted that the above are merely optional embodiments of the present disclosure and the technical principles used therein. It will be understood by those skilled in the art that the present disclosure is not limited to the specific embodiments described herein. Those skilled in the art can make various apparent modifications, adaptations and substitutions without departing from the scope of the present disclosure. Therefore, while the present invention has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A display panel, comprising:
a plurality of scanning lines;
a plurality of sub-pixels arranged in a plurality of rows each connecting to one of the plurality of scanning lines, wherein the sub-pixels in the same row are of a same type of emission;
    wherein the plurality of sub-pixels comprises: first sub-pixels, second sub-pixels and third sub-pixels, wherein the first sub-pixels comprise a first group of first sub-pixels and a second group of first sub-pixels, and the third sub-pixels comprise a first group of third sub-pixels and a second group of third sub-pixels;
and
a scanning drive circuit, wherein the scanning drive circuit is electrically connected to the plurality of scanning lines individually, wherein the scanning drive circuit is configured to drive the first group of first sub-pixels, the second sub-pixels and the first group of third sub-pixels together to emit light at a $(2j+1)$th frame, and wherein the scanning drive circuit is configured to drive the second group of first sub-pixels, the second sub-pixels and the second group of third sub-pixels to emit light at a $(2j+2)$th frame, wherein j is a non-negative integer.

2. The display panel of claim 1, wherein the scanning drive circuit comprises: a first shift registers group and a second shift registers group;
the first shift registers group is electrically connected to the scanning line connected to the first group of first sub-pixels, the scanning lines connected to the second sub-pixels and the scanning line connected to the first group of third sub-pixels separately; and
the second shift registers group is electrically connected to the scanning line connected to the second group of first sub-pixels, scanning lines electrically connected to the second sub-pixels and the scanning line connected to the second group of third sub-pixels.

3. The display panel of claim 2, wherein among the plurality of scanning lines, a $(6k+1)$th scanning line is connected to a row of the first group of first sub-pixels, a $(6k+2)$th scanning line is connected to a row of the second sub-pixels, a $(6k+3)$th scanning line is connected to a row of the first group of third sub-pixels, a $(6k+4)$th scanning line is connected to a row of the second group of first sub-pixels, a $(6k+5)$th scanning line is connected to a row of the second sub-pixels, and a $(6k+6)$th scanning line is connected to a row of the second group of third sub-pixels; wherein k is a non-negative integer.

4. The display panel of claim 3, wherein the first shift registers group and the second shift registers group each comprise a plurality of cascaded shift registers;
wherein in the first shift registers group, a $(4k+1)$th stage shift register is electrically connected to the $(6k+1)$th scanning line, a $(4k+2)$th stage shift register is electrically connected to the $(6k+2)$th scanning line, a $(4k+3)$th stage shift register is electrically connected to the $(6k+3)$th scanning line, and a $(4k+4)$th stage shift register is electrically connected to the $(6k+5)$th scanning line;
wherein in the second shift registers group, a $(4k+1)$th stage shift register is electrically connected to the $(6k+2)$th scanning line, a $(4k+2)$th stage shift register is electrically connected to the $(6k+4)$th scanning line, a $(4k+3)$th stage shift register is electrically connected to the $(6k+5)$th scanning line, and a $(4k+4)$th stage shift register is electrically connected to the $(6k+6)$th scanning line.

5. The display panel of claim 4, wherein the first shift registers group further comprises a plurality of first dummy shift registers, each electrically connected to one of the $(6k+4)$th scanning line and the $(6k+6)$th scanning line in one-to-one relationship respectively;
and wherein the second shift registers group further comprises a plurality of second dummy shift registers, each electrically connected to the $(6k+4)$th scanning line and the $(6k+3)$th scanning line in one-to-one relationship respectively.

6. The display panel of claim 2, further comprising a display area and a non-display area;
wherein the first shift registers group and the second shift registers group are both located in the non-display area, and the first shift registers group and the second shift registers group are disposed on two opposing sides of the display area respectively.

7. The display panel of claim 1, wherein the scanning drive circuit further comprises: a third shift registers group, a fourth shift registers group, a fifth shift registers group, a sixth shift registers group and a seventh shift registers group;
wherein the third shift registers group is electrically connected to the scanning line connected to the first group of first sub-pixels; the fourth shift registers group is electrically connected to scanning lines connected to the second sub-pixels; the fifth shift registers group is electrically connected to the scanning line connected to the first group of third sub-pixels; the sixth shift registers group is electrically connected to the scanning line connected to the second group of first sub-pixels; and the seventh shift registers group is electrically connected to the scanning line connected to the second group of third sub-pixels.

8. The display panel of claim 7, wherein a $(6k+1)$th scanning line is connected to the first group of first sub-pixels, a $(6k+2)$th scanning line is connected to the second sub-pixels, a $(6k+3)$th scanning line is connected to the first group of third sub-pixels, a $(6k+4)$th scanning line is connected to the second group of first sub-pixels, a $(6k+5)$th scanning line is connected to the second sub-pixels, a $(6k+6)$th scanning line is connected to the second group of third sub-pixels, wherein k is a non-negative integer.

9. The display panel of claim 8, wherein the third shift registers group, the fourth shift registers group, the fifth shift registers group, the sixth shift registers group and the seventh shift registers group each comprise a plurality of cascaded shift registers;
- a kth stage shift registers in the third shift registers group is electrically connected to the (6k+1)th scanning line;
- a (2k+1)th stage shift registers in the fourth shift registers group is electrically connected to the (6k+2)th scanning line, and a (2k+2)th stage shift registers is electrically connected to the (6k+5)th scanning line;
- a kth stage shift registers in the fifth shift registers group is electrically connected to the (6k+3)th scanning line;
- a kth stage shift registers in the sixth shift registers group is electrically connected to the (6k+4)th scanning line; and
- a kth stage shift registers in the seventh shift registers group is electrically connected to the (6k+6)th scanning line.

10. The display panel of claim 7, further comprising: a display area and a non-display area;
- wherein the third shift registers group, the fourth shift registers group, the fifth shift registers group, the sixth shift registers group and the seventh shift registers group are all located in the non-display area.

11. The display panel of claim 1, wherein a number of first sub-pixels in the first group of first sub-pixels and a number of first sub-pixels in the second group of first sub-pixels are both half of a number of the first sub-pixels; a number of third sub-pixels in the first group of third sub-pixels and a number of third sub-pixels in the second group of third sub-pixels are both half of a number of the third sub-pixels.

12. The display panel of claim 1, wherein the first sub-pixels further comprise a third group of first sub-pixels; and the third sub-pixels further comprise a third group of third sub-pixels;
- wherein the scanning drive circuit is configured to drive the first group of first sub-pixels, the second sub-pixels and the first group of third sub-pixels to emit light in a (3p+1)th frame; drive the second group of first sub-pixels, the second sub-pixels and the second group of third sub-pixels to emit light in a (3p+2)th frame; and drive the third group of first sub-pixels, the second sub-pixels and the third group of third sub-pixels to emit light in a (3p+3)th frame; wherein p is non-negative integer.

13. The display panel of claim 1, wherein the second sub-pixels are green sub-pixels, the first sub-pixels are red sub-pixels, and the third sub-pixels are blue sub-pixels, or wherein the second sub-pixels are green sub-pixels, the first sub-pixels are blue sub-pixels, and the third sub-pixels are red sub-pixels.

14. The display panel of claim 1, wherein the plurality of scanning lines extend along a row direction;
- wherein the plurality of sub-pixels are arranged in an array, and each row of sub-pixels are of a same type; the first sub-pixels, the second sub-pixels, and the third sub-pixels in a same column are alternately arranged.

15. The display panel of claim 1, wherein the plurality of scanning lines extend along a row direction, and each of the plurality of the sub-pixels comprises a pixel circuit and a light-emitting unit; wherein the pixel circuits of the plurality of the sub-pixels are arranged in an array, the pixel circuits are arranged in N1 rows and M1 columns, N1 and M1 are both positive integers; wherein the light-emitting units of the plurality of the sub-pixels are arranged in an array, the light-emitting units are arranged in N2 rows and M2 columns, N2 and M2 are both positive integers; and N1×M1=N2×M2, N1#N2, M1#M2.

16. The display panel of claim 1, wherein the display panel is at least one of an organic light-emitting diode display panel, a liquid crystal display panel, a micro light-emitting diode display panel, or an electrophoretic display panel.

17. A method for driving a display panel,
- wherein the display panel comprises: a plurality of scanning lines, a plurality of sub-pixels and a scanning drive circuit, wherein the plurality of sub-pixels are arranged in a plurality of rows, each connecting to one of the plurality of scanning lines, wherein the plurality of sub-pixels comprise: first sub-pixels, second sub-pixels and third sub-pixels; wherein the sub-pixels in the same row are of a same type of emission; wherein the first sub-pixels comprise a first group of first sub-pixels and a second group of first sub-pixels, and the third sub-pixels comprise a first group of third sub-pixels and a second group of third sub-pixels; the scanning drive circuit is electrically connected to the plurality of scanning lines;

the drive method comprises:
- in a (2j+1)th frame, transmitting, by the scanning drive circuit, a scanning signal sequentially to the scanning line connected to the first group of first sub-pixels, scanning lines connected to the second sub-pixels and the scanning line connected to the first group of third sub-pixels so as to drive the first group of first sub-pixels, the second sub-pixels and the first group of third sub-pixels to emit light;
- in a (2j+2)th frame, transmitting, by the scanning drive circuit, the scanning signal sequentially to the scanning line connected to the second group of first sub-pixels, scanning lines connected to the second sub-pixels and the scanning line connected to the second group of third sub-pixels so as to drive the second group of first sub-pixels, the second sub-pixels and the second group of third sub-pixels to emit light;
- wherein j is a non-negative integer.

18. The method of claim 17, wherein the scanning drive circuit comprises:
- a first shift registers group and a second shift registers group; the first shift registers group is electrically connected to the first group of first sub-pixels, the second sub-pixels and the first group of third sub-pixels; the second shift registers group is electrically connected to the second group of first sub-pixels, the second sub-pixels and the second group of third sub-pixels;
- a (6k+1)th scanning line is connected to the first group of first sub-pixels, a (6k+2)th scanning line is connected to the second sub-pixels, a (6k+3)th scanning line is connected to the first group of third sub-pixels, a (6k+4)th scanning line is connected to the second group of first sub-pixels, a (6k+5)th scanning line is connected to the second sub-pixels, a (6k+6)th scanning line is connected to the second group of third sub-pixels; wherein k is a non-negative integer;
- wherein the method further comprises:
- a step of transmitting, by the scanning drive circuit, the scanning signal sequentially in time to the scanning lines connected to the first group of first sub-pixels, to the scanning lines connected to the second sub-pixels and to the scanning lies connected to the first group of third sub-pixels;

wherein the transmitting step comprises:
transmitting, by the first shift registers group, the scanning signal sequentially to the scanning lines connected to the first group of first sub-pixels, the scanning lines connected to the second sub-pixels and the scanning lines connected to the first group of third sub-pixels; and
transmitting, by the second shift registers group, a disable signal to the scan lines connected to the second group of first sub-pixels and the scan lines connected to the second group of third sub-pixels;
wherein transmitting, by the scanning drive circuit, the scanning signal sequentially to the scanning line connected to the second group of first sub-pixels, the scanning lines connected to the second sub-pixels and the scanning line connected to the second group of third sub-pixels comprises:
transmitting, by the second shift registers group, the scanning signal sequentially to the scanning lines connected to the second group of first sub-pixels, the scanning lines connected to the second sub-pixels and the scanning line connected to the second group of third sub-pixels; and
transmitting, by the first shift registers group, the disable signal to the scan lines connected to the first group of first sub-pixels and the first group of third sub-pixels.

19. The method of claim 17, wherein the scanning drive circuit further comprises: a third shift registers group, a fourth shift registers group, a fifth shift registers group, a sixth shift registers group and a seventh shift registers group; the third shift registers group is electrically connected to the first group of first sub-pixels; the fourth shift registers group is electrically connected to the second sub-pixels; the fifth shift registers group is electrically connected to the first group of third sub-pixels; the sixth shift registers group is electrically connected to the second group of first sub-pixels and the seventh shift registers group is electrically connected to the second group of third sub-pixels;
a (6k+1)th scanning line is connected to the first group of first sub-pixels, a (6k+2)th scanning line is connected to the second sub-pixels, a (6k+3)th scanning line is connected to the first group of third sub-pixels, a (6k+4)th scanning line is connected to the second group of first sub-pixels, a (6k+5)th scanning line is connected to the second sub-pixels, a (6k+6)th scanning line is connected to the second group of third sub-pixels; wherein k is a non-negative integer;
wherein the method further comprises,
a transmitting step, by the scanning drive circuit, the scanning signal sequentially to the scanning lines connected to the first group of first sub-pixels, the scanning lines connected to the second sub-pixels and the scanning lines connected to the first group of third sub-pixels, wherein the transmitting step comprises:
transmitting, by the third shift registers group, the scanning signal to the scan lines connected to the first group of first sub-pixels sequentially timewise;
transmitting, by the fourth shift registers group, the scanning signal to the scan lines connected to the second sub-pixels sequentially timewise; and
transmitting, by the fifth shift registers group, the scanning signal to the scan lines connected to the first group of third sub-pixels sequentially timewise;
wherein transmitting, by the scanning drive circuit, the scanning signal sequentially to the scanning lines connected to the second group of first sub-pixels, the scanning lines connected to the second sub-pixels and the scanning lines connected to the second group of third sub-pixels comprises:
transmitting, by the fourth shift registers group, the scanning signal to the scan lines connected to the second sub-pixels sequentially;
transmitting, by the sixth shift registers group, the scanning signal to the scan lines connected to the second group of first sub-pixels sequentially; and
transmitting, by the seventh shift registers group, the scanning signal to the scan lines connected to the second group of third sub-pixels sequentially.

20. The method of claim 17, wherein a number of first sub-pixels in the first group of first sub-pixels and a number of first sub-pixels in the second group of first sub-pixels are both half of a number of the first sub-pixels; wherein a number of third sub-pixels in the first group of third sub-pixels and a number of third sub-pixels in the second group of third sub-pixels are both half of a number of the third sub-pixels.

21. The method of claim 17, wherein the first sub-pixels further comprise a third group of first sub-pixels; and the third sub-pixels further comprise a third group of third sub-pixels;
wherein the method further comprises:
in a (3p+1)th frame, transmitting, by the scanning drive circuit, the scanning signal sequentially to the scanning lines connected to the first group of first sub-pixels, the scanning lines connected to the second sub-pixels and the scanning lines connected to the first group of third sub-pixels, so as to drive the first group of first sub-pixels, the second sub-pixels and the first group of third sub-pixels to emit light;
in a (3p+2)th frame, transmitting by, the scanning drive circuit, the scanning signal sequentially to the scanning lines connected to the second group of first sub-pixels, the scanning lines connected to the second sub-pixels and the scanning line connected to the second group of third sub-pixels, so as to drive the second group of first sub-pixels, the second sub-pixels and the second group of third sub-pixels to emit light; and
in a (3p+3)th frame, transmitting by, the scanning drive circuit, the scanning signal sequentially to the scanning lines connected to the third group of first sub-pixels, the scanning lines connected to the second sub-pixels and the scanning lines connected to the third group of third sub-pixels, so as to drive the third group of first sub-pixels, the second sub-pixels and the third group of third sub-pixels to emit light, wherein p is a non-negative integer.

22. A display device, comprising a display panel, wherein the display panel comprises:
a plurality of scanning lines;
a plurality of sub-pixels arranged in a plurality of rows, wherein each of the plurality of scanning lines is connected to a respective one of the plurality of rows, wherein the plurality of sub-pixels comprise: first sub-pixels, second sub-pixels and third sub-pixels; wherein the sub-pixels in the same row are of a same type; wherein the first sub-pixels comprise a first group of first sub-pixels and a second group of first sub-pixels, and the third sub-pixels comprise a first group of third sub-pixels and a second group of third sub-pixels; and
a scanning drive circuit, wherein the scanning drive circuit is electrically connected to the plurality of scanning lines separately; wherein the scanning drive circuit is configured to drive the first group of first sub-pixels, the second sub-pixels and the first group of third sub-pixels to emit light at a (2j+1)th frame, and drive the second group of first sub-pixels, the second sub-pixels and the second group of third sub-pixels to emit light at a (2j+2)th frame; wherein j is a non-negative integer.

* * * * *